US008914054B2

(12) United States Patent
Dimou et al.

(10) Patent No.: US 8,914,054 B2
(45) Date of Patent: Dec. 16, 2014

(54) DYNAMIC RESOURCE SELECTION TO REDUCE INTERFERENCE RESULTING FROM DIRECT DEVICE TO DEVICE COMMUNICATIONS

(75) Inventors: Konstantinos Dimou, Stockholm (SE); Francisco Rodrigo P. Cavalcanti, Fortaleza (BR); Gabor Fodor, Hasselby (SE); Tarcísio Maciel, Fortaleza (BR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 444 days.

(21) Appl. No.: 13/425,836

(22) Filed: Mar. 21, 2012

(65) Prior Publication Data

US 2013/0252654 A1 Sep. 26, 2013

(51) Int. Cl.
*H04B 7/00* (2006.01)
(52) U.S. Cl.
CPC ............ *H01W 72/04* (2013.01); *H01W 72/044* (2013.01); *H01W 76/023* (2013.01)
USPC ........... 455/517; 455/500; 455/509; 455/518; 455/513; 455/445; 370/310; 370/328; 370/329; 370/330; 370/336
(58) Field of Classification Search
CPC . H04W 72/04; H04W 76/023; H04W 72/044; H04W 72/0453; H04W 92/18; H04W 8/005
USPC ................. 455/517, 500, 450, 518, 519, 524, 455/550.1, 426.1, 426.2, 422.1, 403, 561, 455/562.1, 508, 456.1–457, 67.1, 525; 370/310, 313, 328, 329, 330, 336, 338, 370/343, 260, 261, 263
See application file for complete search history.

(56) References Cited

U.S. PATENT DOCUMENTS

2004/0048609 A1 3/2004 Kosaka
2007/0211677 A1 9/2007 Laroia et al.
(Continued)

FOREIGN PATENT DOCUMENTS

EP 2012443 A2 1/2009
WO 2011088619 A1 7/2011
(Continued)

OTHER PUBLICATIONS

Non-Final Office Action for U.S. Appl. No. 13/465,303, mailed Dec. 17, 2013, 13 pages.
(Continued)

*Primary Examiner* — Keith Ferguson
(74) *Attorney, Agent, or Firm* — Withrow & Terranova, PLLC

(57) ABSTRACT

Systems and methods are disclosed for selecting resources for direct device to device communications in a cellular communication network. Preferably, resources for the direct device to device communications are selected to minimize, or at least substantially reduce, interference that results from the direct device to device communications in the cellular communication network. In one embodiment, a downlink resource of the cellular communication network is selected as a resource for a direct device to device communication link between a first wireless device and a second wireless device if at least one of the first and second wireless devices is less than a predefined threshold radio distance from a closest base station in the cellular communication network. Otherwise, an uplink resource of the cellular communication network is selected as a resource for the direct device to device communication link between the first and second wireless devices.

30 Claims, 18 Drawing Sheets

(56) References Cited

U.S. PATENT DOCUMENTS

| | | |
|---|---|---|
| 2008/0310329 A1 | 12/2008 | Sun et al. |
| 2009/0010185 A1 | 1/2009 | Li et al. |
| 2009/0016229 A1 | 1/2009 | Wu et al. |
| 2009/0016261 A1 | 1/2009 | Laroia et al. |
| 2009/0016363 A1 | 1/2009 | Laroia et al. |
| 2009/0017843 A1 | 1/2009 | Laroia et al. |
| 2009/0034447 A1 | 2/2009 | Yu et al. |
| 2010/0093364 A1 | 4/2010 | Ribeiro et al. |
| 2011/0063995 A1 | 3/2011 | Chen et al. |
| 2011/0223953 A1 | 9/2011 | Lee et al. |
| 2011/0228666 A1* | 9/2011 | Barbieri et al. ............... 370/216 |
| 2012/0020213 A1 | 1/2012 | Horneman et al. |
| 2012/0044815 A1 | 2/2012 | Geirhofer et al. |
| 2012/0202542 A1 | 8/2012 | Dimou et al. |

FOREIGN PATENT DOCUMENTS

| | | |
|---|---|---|
| WO | 2011116815 A1 | 9/2011 |
| WO | 2011123799 A1 | 10/2011 |
| WO | 2012015698 A1 | 2/2012 |

OTHER PUBLICATIONS

International Search Report and Written Opinion for PCT/IB2013/056741, mailed Jan. 16, 2014, 12 pages.

International Search Report and Written Opinion for PCT/IB2013/054965 mailed Feb. 7, 2014, 10 pages.

Doppler, K. et al., "Mode Selection for Device-to-Device Communication Underlaying an LTE-Advanced Network," IEEE Wireless Communications and Networking Conference, Sydney, Australia, Apr. 2010, 6 pages.

Doppler, K. et al.,"Device-to-Device Communication as an Underlay to LTE-Advanced Networks," IEEE Communications Magazine, vol. 47, No. 12, Dec. 2009, pp. 42-49.

Corson, M.S. et al., "Towards Proximity-Aware Internetworking," IEEE Wireless Communications, Dec. 2010, pp. 26-33.

Peng, T. et al., "Interference Avoidance Mechanisms in the Hybrid Cellular and Device-2-Device Systems," 2009 IEEE 20th International Symposium on Personal, Indoor and Mobile Radio Communications, Sep. 2009, pp. 617-621.

Yu, C.H. et al., "Power Optimization of Device-to-Device Communication Underlaying Cellular Communication," IEEE International Conference on Communications, ICC, Dresden, Germany, Jun. 2009, 5 pages.

Li, Yu et al., "Adaptive TDD UL/DL Slot Utilization for Cellular Controlled D2D Communications," 2011 IEEE Global Mobile Congress, Oct. 17, 2011, pp. 1-6.

Yu, Chia-Hao et al., "On the Performance of Device-to-Device Underlay Communication with Simple Power Control," 2009 IEEE 69th Vehicular Technology Conference, Apr. 26-29, 2009, pp. 1-5, Barcelona, Spain.

International Search Report and Written Opinion for PCT/IB2013/052220, mailed Sep. 5, 2013, 15 pages.

International Search Report and Written Opinion for PCT/IB2013/053631, mailed Nov. 22, 2013, 12 pages.

Final Office Action for U.S. Appl. No. 13/465,303, mailed Jun. 13, 2014, 15 pages.

Notice of Allowance for U.S. Appl. No. 13/465,303, mailed Aug. 15, 2014, 8 pages.

Notice of Allowance for U.S. Appl. No. 13/525,752, mailed Aug. 12, 2014, 9 pages.

* cited by examiner

DYNAMIC RESOURCE SELECTION TO REDUCE INTERFERENCE RESULTING FROM DIRECT DEVICE TO DEVICE COMMUNICATIONS

FIELD OF THE DISCLOSURE

The present disclosure relates to direct device to device communications in a cellular communication network and more particularly relates to reducing interference resulting from direct device to device communications in a cellular communication network.

BACKGROUND

Network-assisted direct device to device (D2D) communication is expected to be a key feature supported by next generation cellular communication networks. FIG. 1 illustrates a cellular communication network 10 that enables direct D2D communications. As illustrated, the cellular communication network 10 includes a base station 12 that serves a corresponding cell 14 of the cellular communication network 10. While only one base station 12 is illustrated, the cellular communication network 10 includes numerous base stations 12 serving corresponding cells 14. In this example, wireless devices (WDs) 16, 18, 20, and 22 are located within the cell 14. The wireless devices 16 and 18 are in proximity to one another. As such, when the wireless devices 16 and 18 desire to establish a bearer link, rather than establishing the bearer link through the base station 12, the cellular communication network 10 assists the wireless devices 16 and 18 to establish a direct D2D communication link (i.e., a direct D2D bearer link) between one another. More specifically, through signaling with the base station 12 or some other mechanism, the wireless devices 16 and 18 discover one another using a D2D device discovery process and then establish a D2D communication link directly between one another rather than through the base station 12.

Direct D2D communication is possible regardless of whether the cellular communication network 10 is Frequency Division Duplex (FDD) (i.e., uses different uplink and downlink frequency bands) or Time Division Duplex (i.e., using the same frequency band but different time slots for uplink and downlink). However, it is commonly accepted that direct D2D communication links, such as that established between the wireless devices 16 and 18, is preferably a TDD communication link where transmission by one wireless device uses the same resources as reception by the other wireless device. These "resources" are physical frequency and/or time resources depending on the particular implementation of the cellular communication network 10. TDD (i.e., half duplex operation) is preferred because operating a transmitter and receiver in the same frequency band in a half duplex fashion is easier to implement than a full duplex FDD implementation.

In order to provide spectral efficiency, it is preferable for the D2D communication links to use the same resources as those used by the cellular communication network 10 where the cellular communication network 10 performs actions such as mode selection, network-controlled scheduling, and power control. In this example, the D2D communication link uses either an uplink resource or a downlink resource of the cellular communication network 10 that is also assigned to the wireless device 22. While using the same resources as the cellular communication network 10 provides spectral efficiency, doing so also gives rise to new intra-cell and inter-cell interference situations. For example, due to the presence of D2D communication links, intra-cell orthogonality is no longer maintained.

Specifically, when the D2D communication link between the wireless devices 16 and 18 uses a downlink (DL) resource of the cellular communication network 10, strong intra-cell interference may be caused for the wireless device 22, which also uses the same DL resource, as illustrated in FIG. 2. In addition, the transmissions over this D2D communication link between the wireless devices 16 and 18 may cause inter-cell interference to wireless devices located in neighboring cells in the cellular communication network 10. For simplicity and for the clarity of presentation, the case of intra-cell DL interference is displayed in FIG. 2. The case of inter-cell, or other cell, interference resulting from the direct D2D communication link between the wireless devices 16 and 18 can be easily deduced. The transmission from, for instance, the wireless device 16 over the D2D communication link to the wireless device 18 using the DL resource of the cellular communication network 10 may result in interference to a wireless device located in a neighboring cell that uses the same DL resource.

Similarly, when the D2D communication link between the wireless devices 16 and 18 uses an uplink (UL) resource of the cellular communication network 10, strong intra-cell interference may be caused to the base station 12 serving the cell 14 for the uplink from the wireless device 22, which uses the same UL resource, as illustrated in FIG. 3. For instance, transmission by the wireless device 16 over the D2D communication link to the wireless device 18 using a UL frequency band of the cellular communication network 10 may result in interference to the base station 12 for an uplink from the wireless device 22 using the same UL frequency band. As with the DL interference, the case of inter-cell interference resulting from D2D communication using UL resources can easily be deduced. Transmissions from, for example, the wireless device 16 over the D2D communication link to the wireless device 18 using the UL resource may also generate interference to base stations serving neighboring cells for uplinks from wireless devices in the neighboring cells that use the same UL resource, which are referred to herein as neighboring base stations.

From the discussion above, it is readily understood that D2D communication using the same resources used for downlinks and uplinks in the cellular communication network 10 results in new interference scenarios not envisioned in conventional cellular communication networks. As such, there is a need for systems and methods for minimizing, or at least substantially reducing, interference resulting from D2D communication in a cellular communication network.

SUMMARY

Systems and methods are disclosed for selecting resources for direct device to device (D2D) communications in a cellular communication network. Preferably, resources for the direct D2D communications are selected to minimize, or at least substantially reduce, interference that results from the direct D2D communications in the cellular communication network. In one embodiment, a downlink resource of the cellular communication network is selected as a resource for a direct D2D communication link between a first wireless device and a second wireless device if at least one of the first and second wireless devices is less than a predefined threshold radio distance from a closest base station in the cellular communication network. Otherwise, an uplink resource of the cellular communication network is selected as a resource for the direct D2D communication link between the first and second wireless devices.

More specifically, in one particular embodiment, a network node obtains an indication of a radio distance between a first wireless device and a base station in the cellular communication network that is closest to the first wireless device. Similarly, the network node obtains an indication of a radio distance between a second wireless device and a base station in the cellular communication network that is closest to the second wireless device. If the radio distance of either the first wireless device or the second wireless device is less than a predefined threshold radio distance, then a downlink resource of the cellular communication network is selected as a resource for a direct D2D communication link between the first wireless device and the second equipment user device. Conversely, if neither of the radio distances for the first and second wireless devices is less than the predefined threshold radio distance, then an uplink resource of the cellular communication network is selected as a resource for a direct D2D communication link between the first wireless device and the second wireless device.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
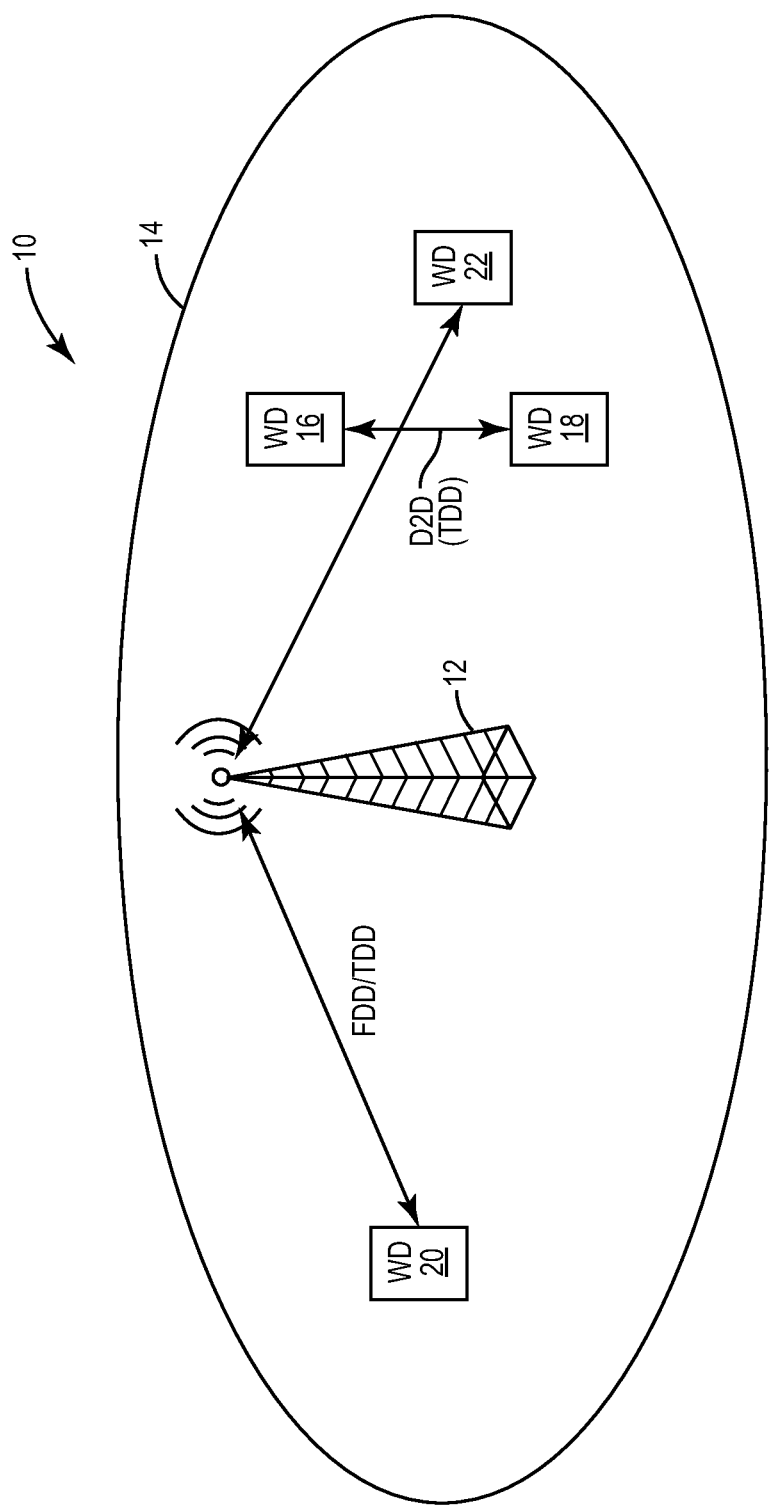
FIG. 1 illustrates a direct device-to-device (D2D) communication link in a cellular communication network.
Figure 2:
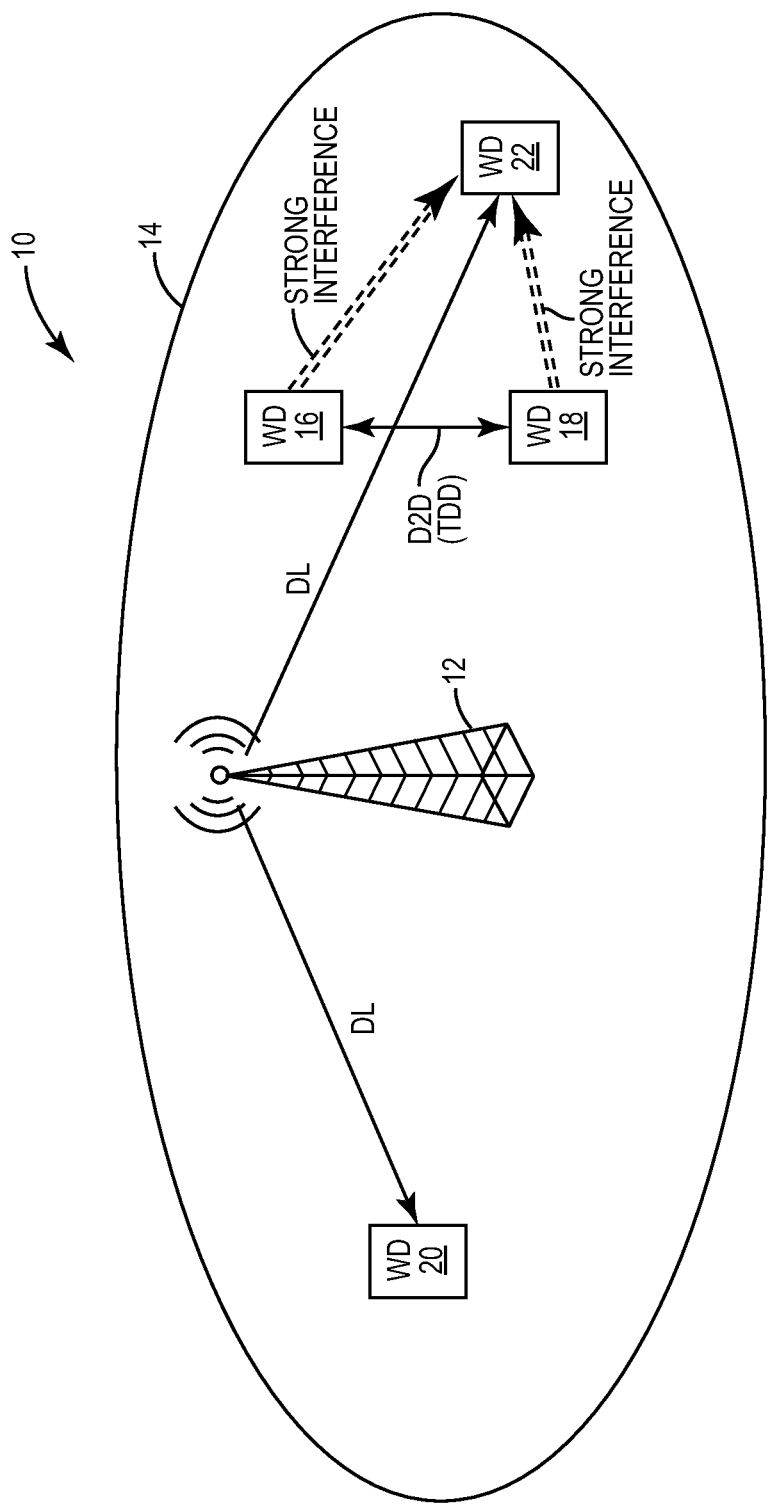
FIG. 2 illustrates a direct D2D communication link that causes strong interference in a downlink from a base station in a cellular communication network.
Figure 3:
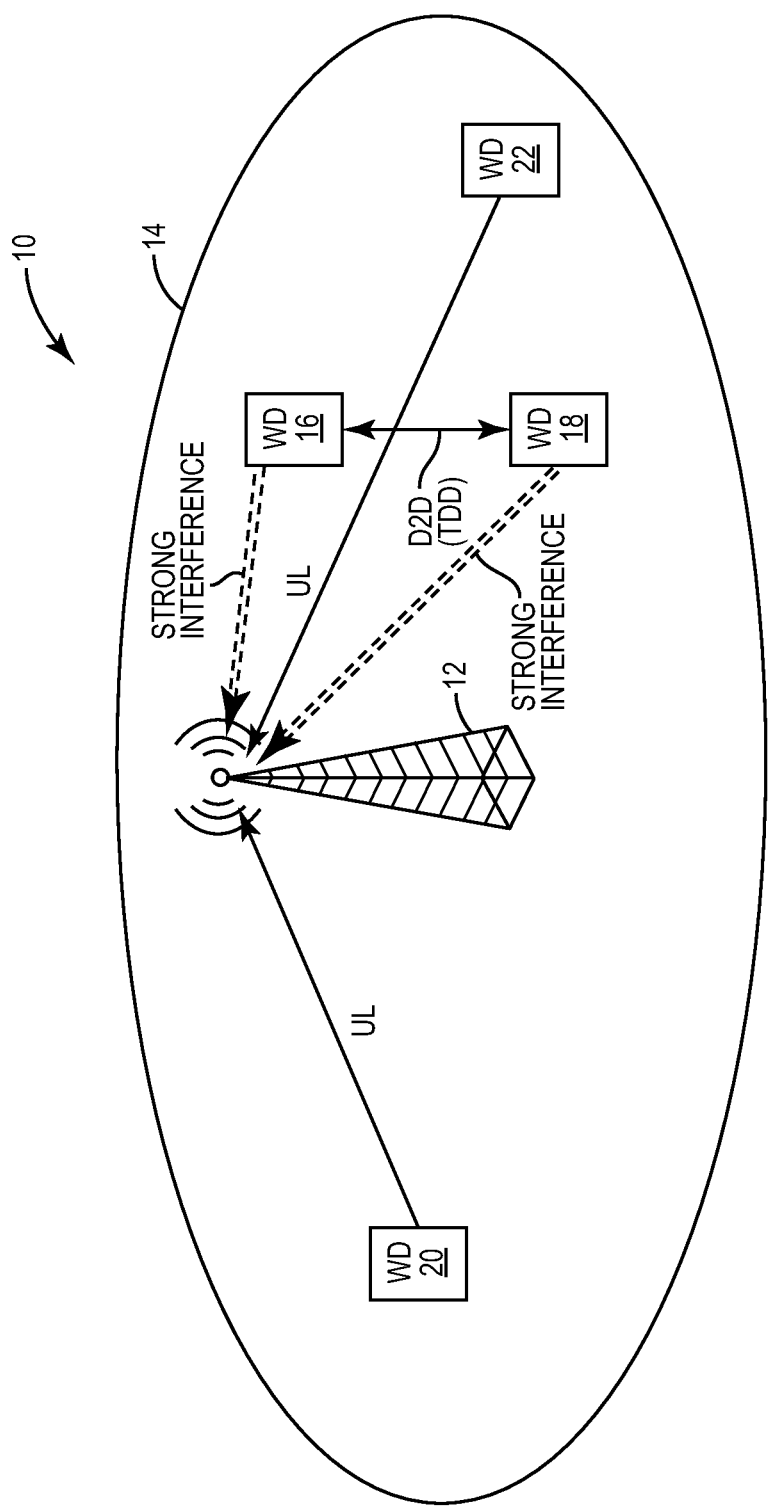
FIG. 3 illustrates a direct D2D communication link that causes strong interference in an uplink from a base station in a cellular communication network.
Figure 4A:
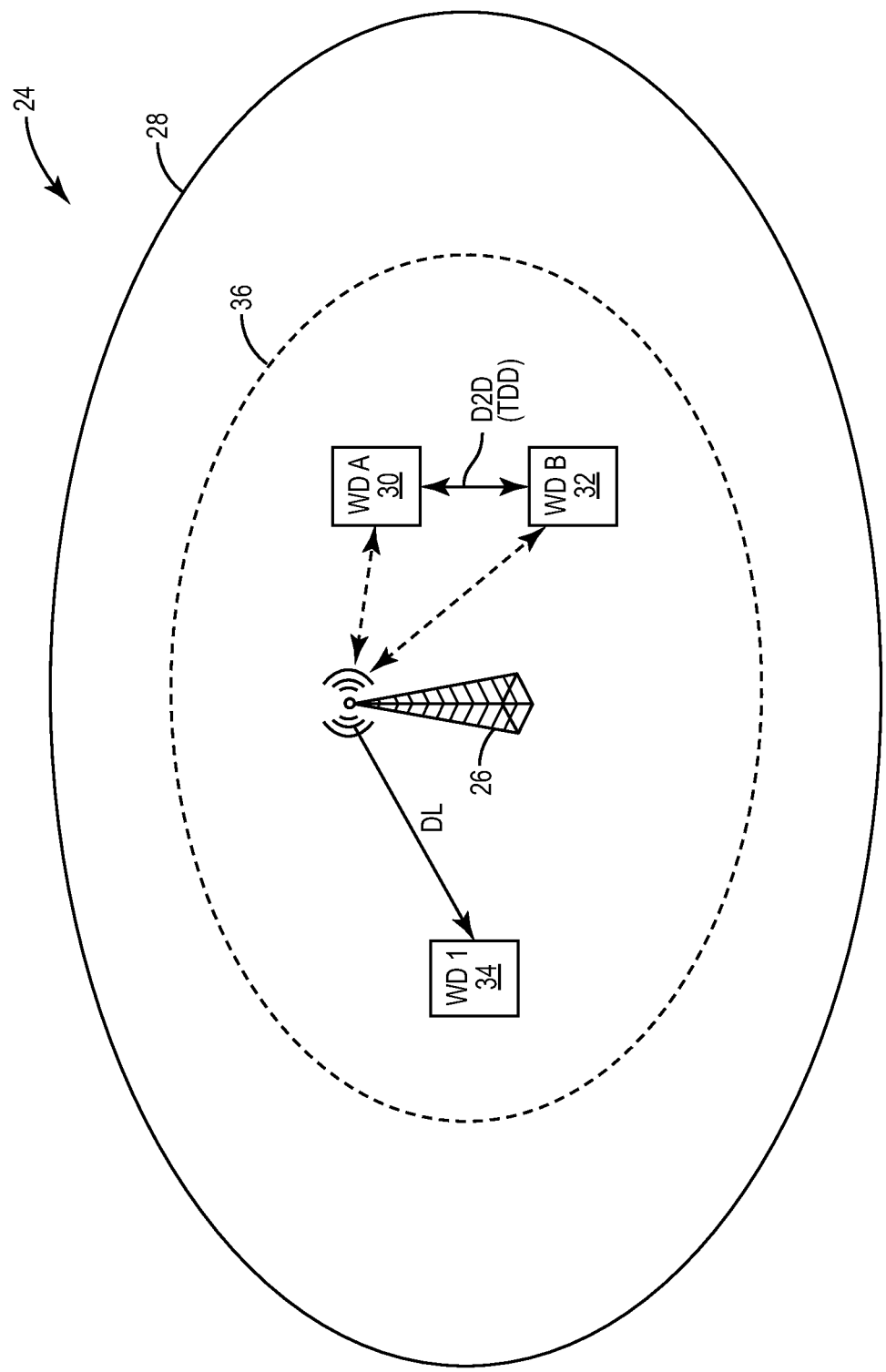
Figure 4B:
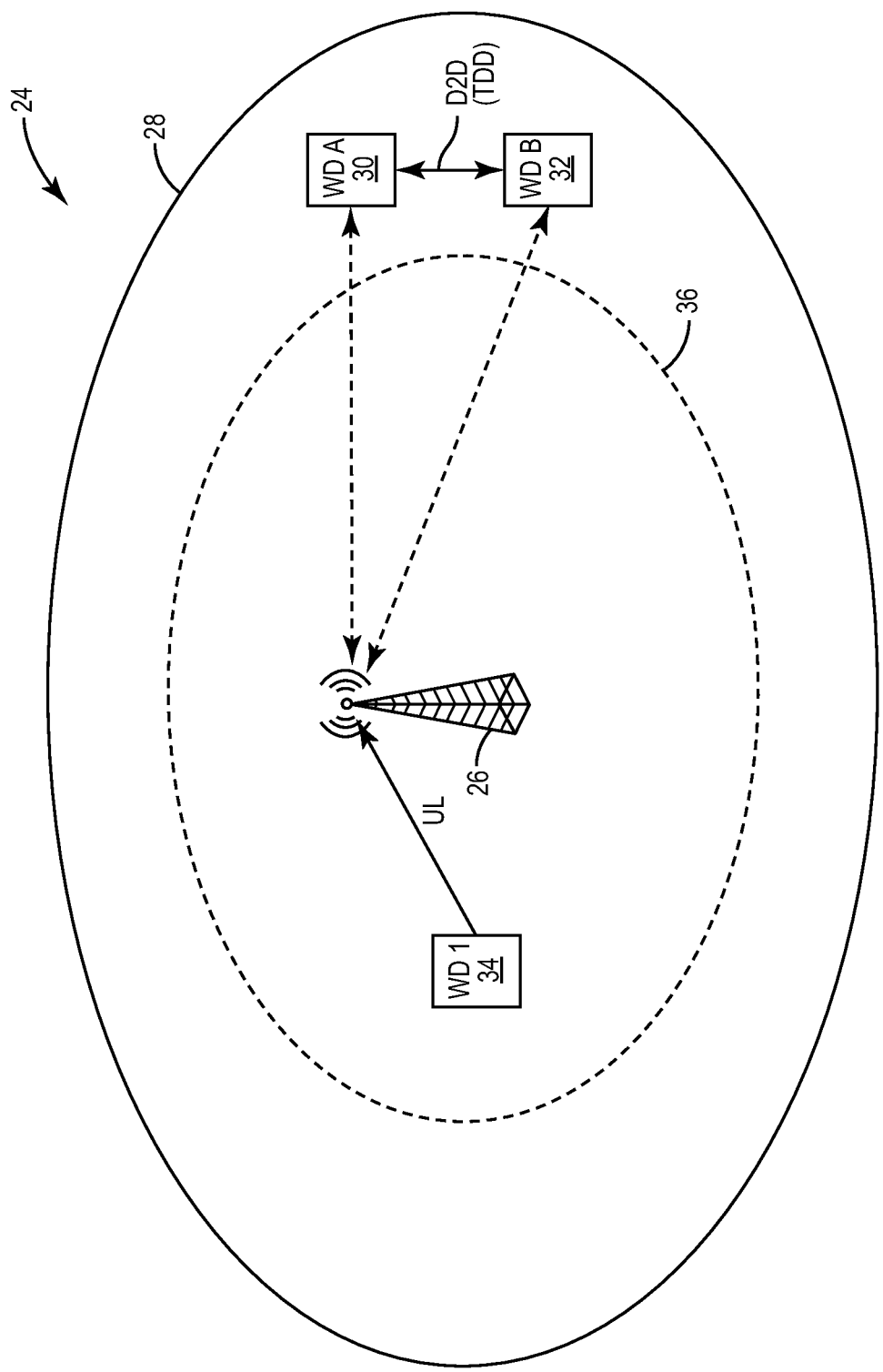
Figure 4C:
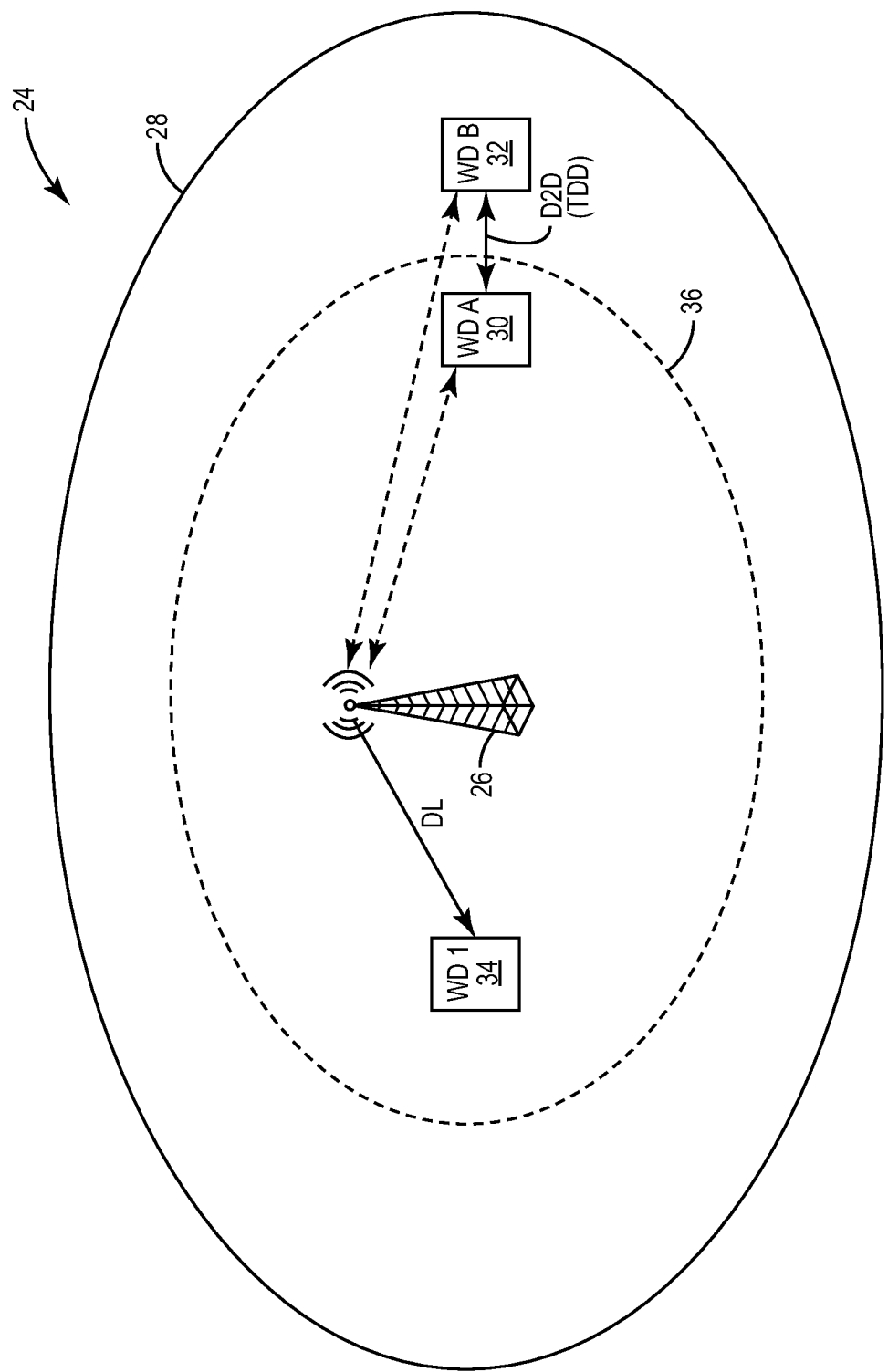
Figure 5:
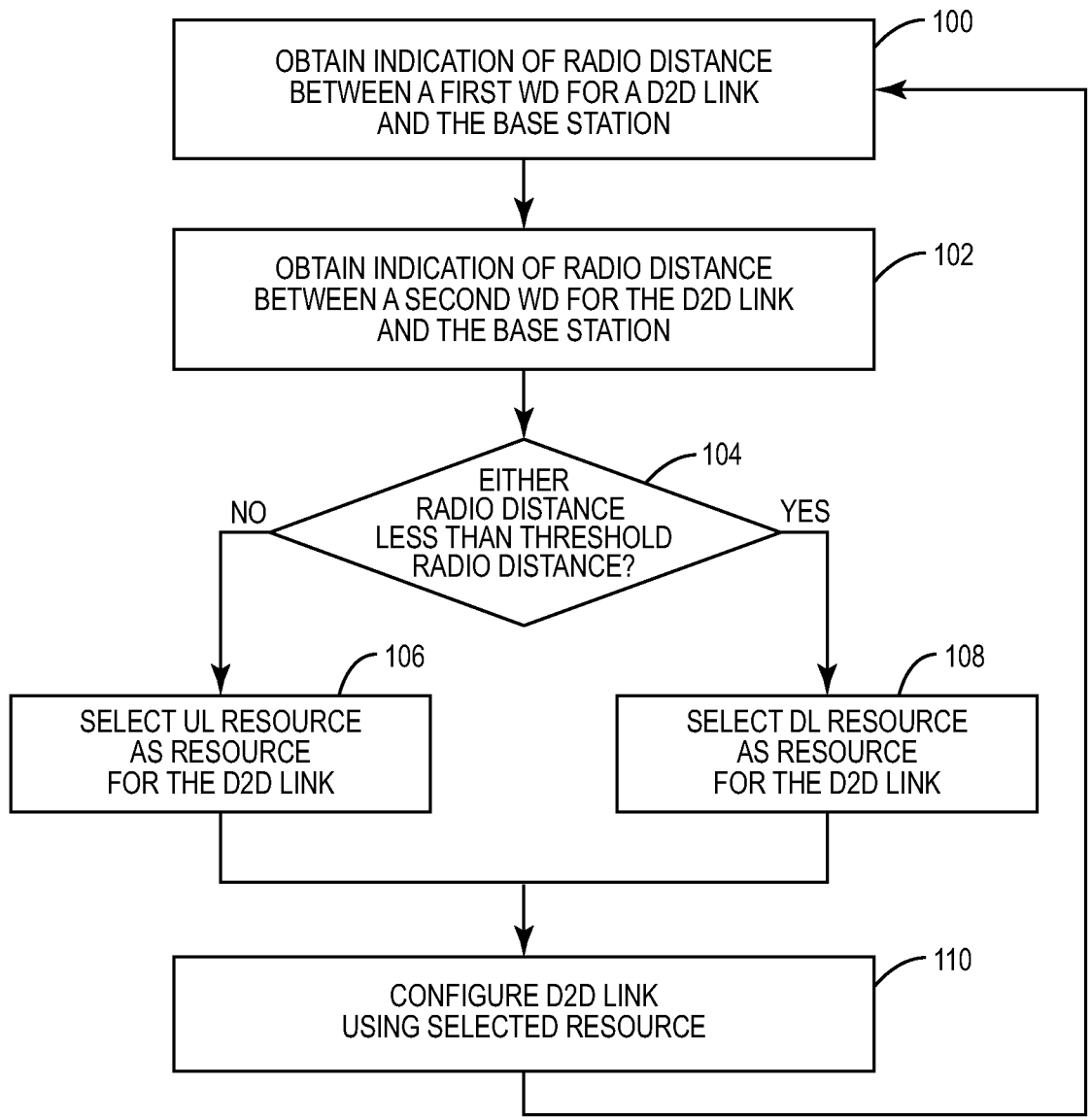
Figure 6:
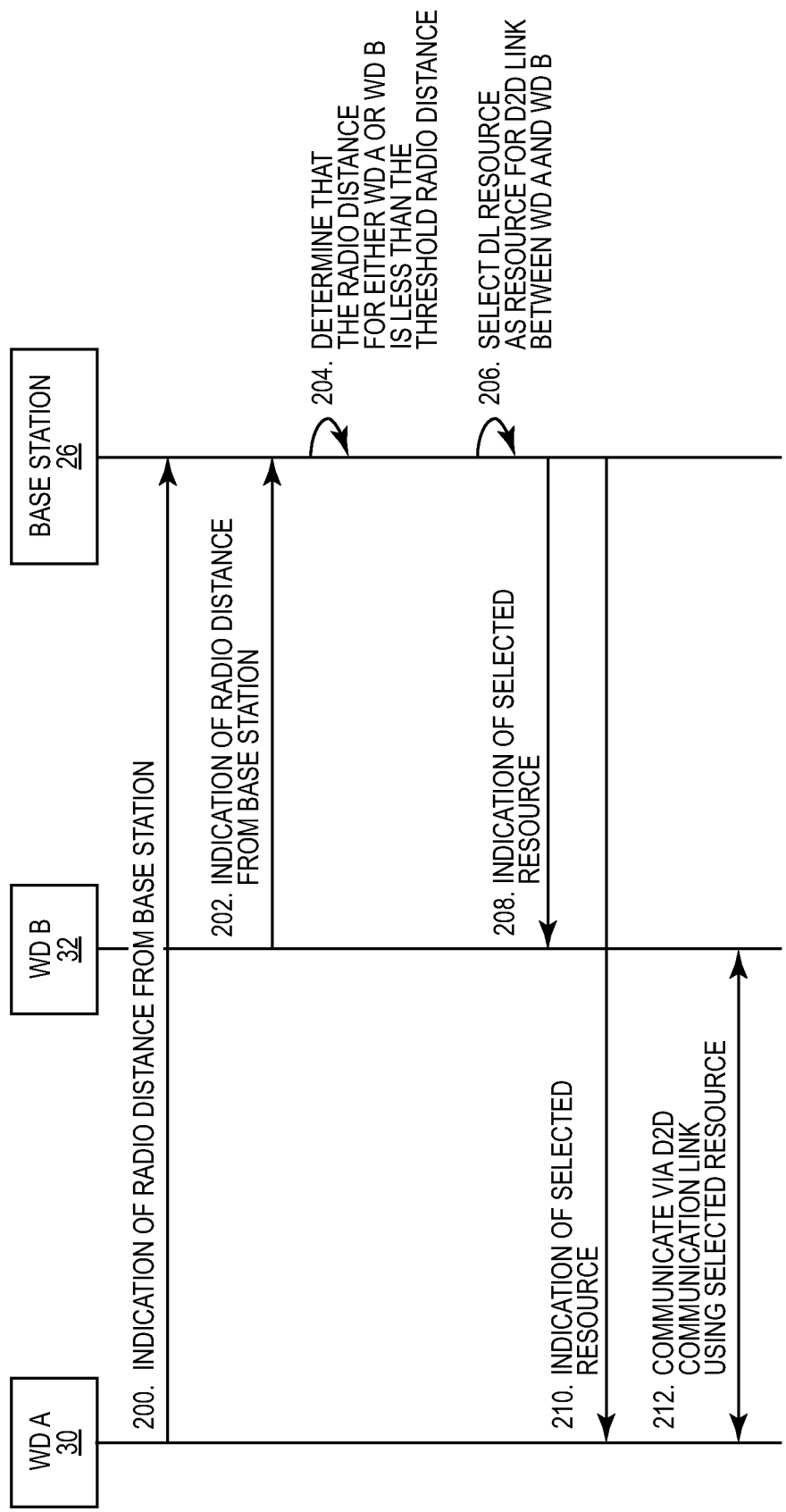
Figure 7:
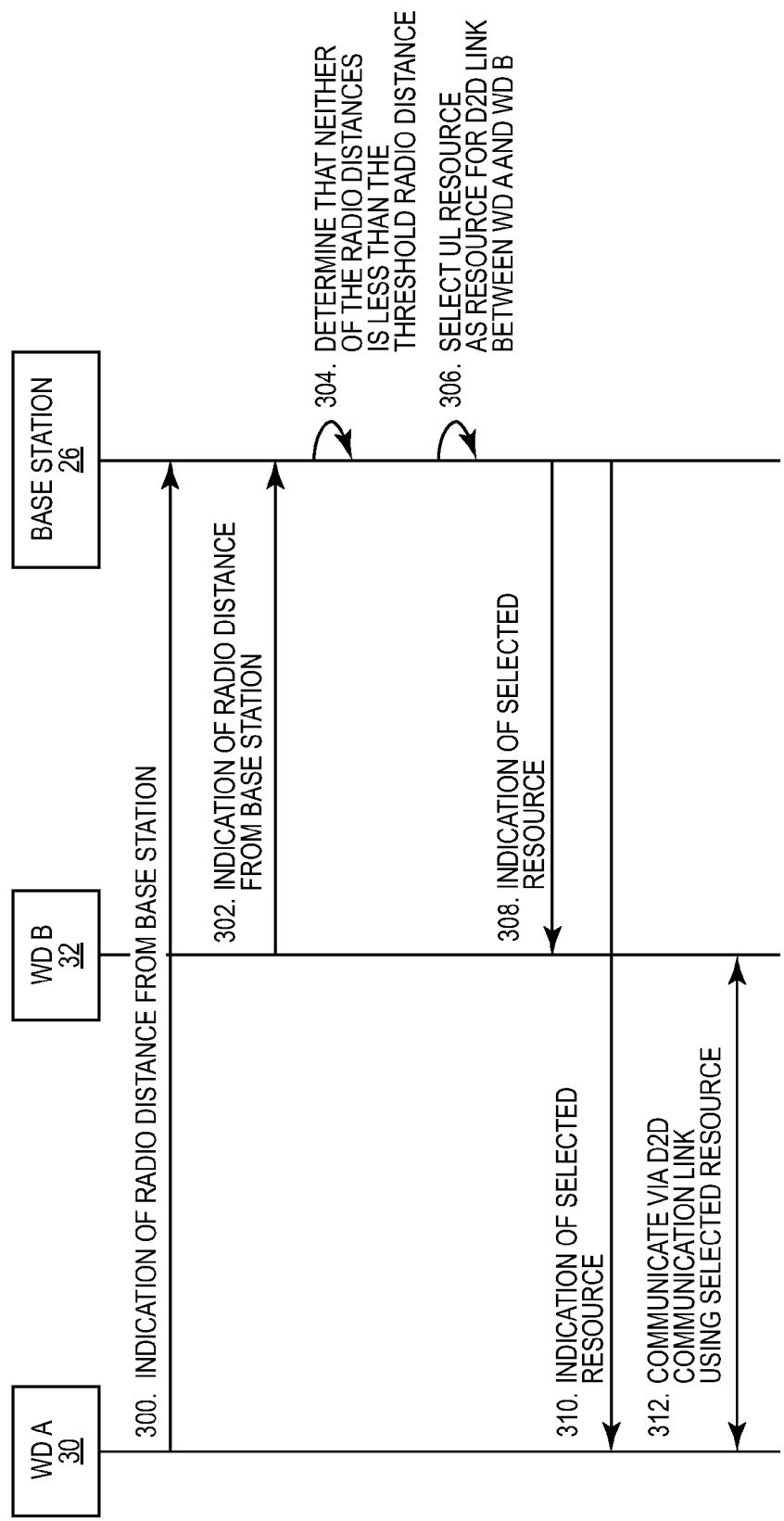
Figure 8:
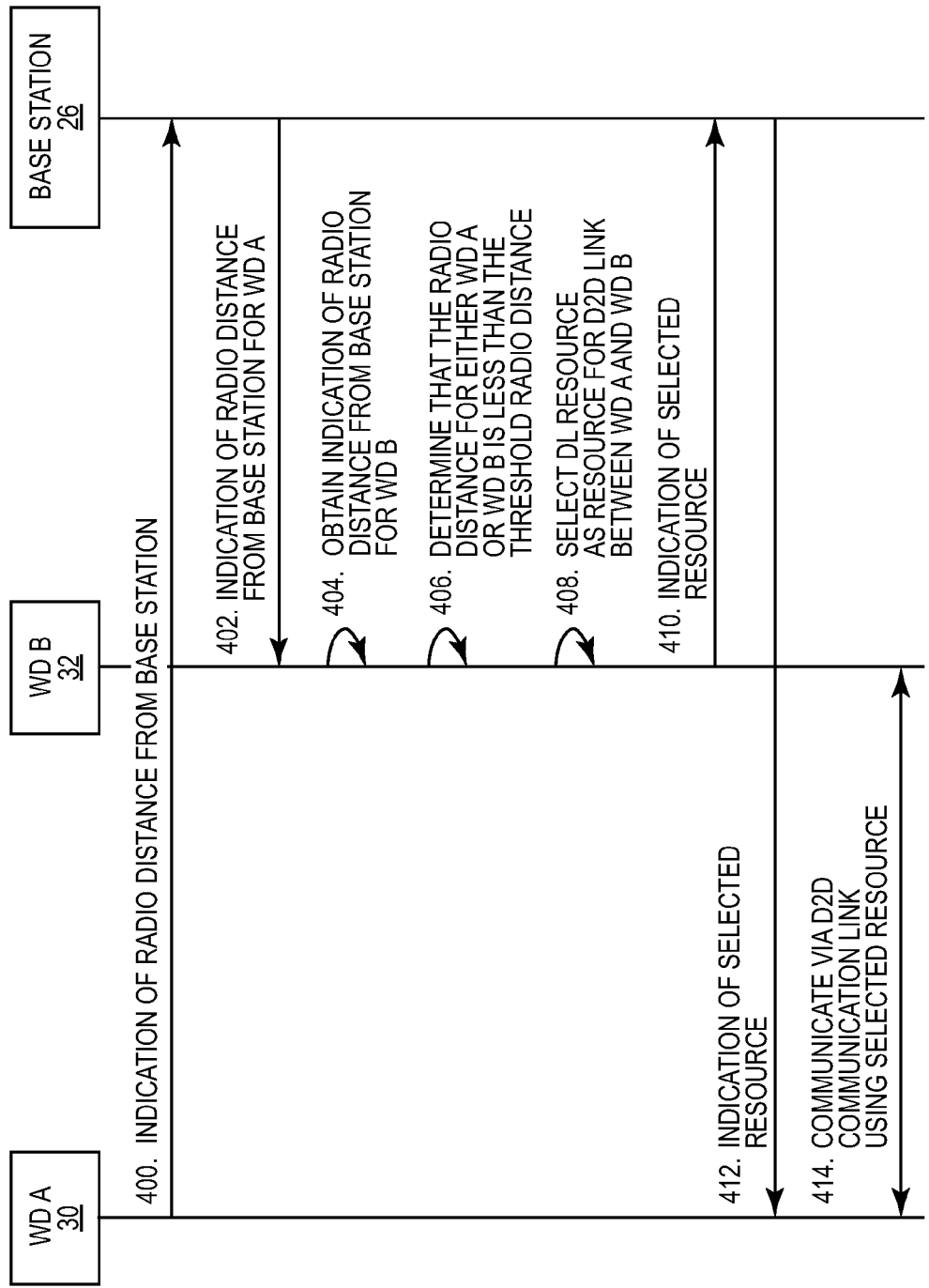
Figure 9:
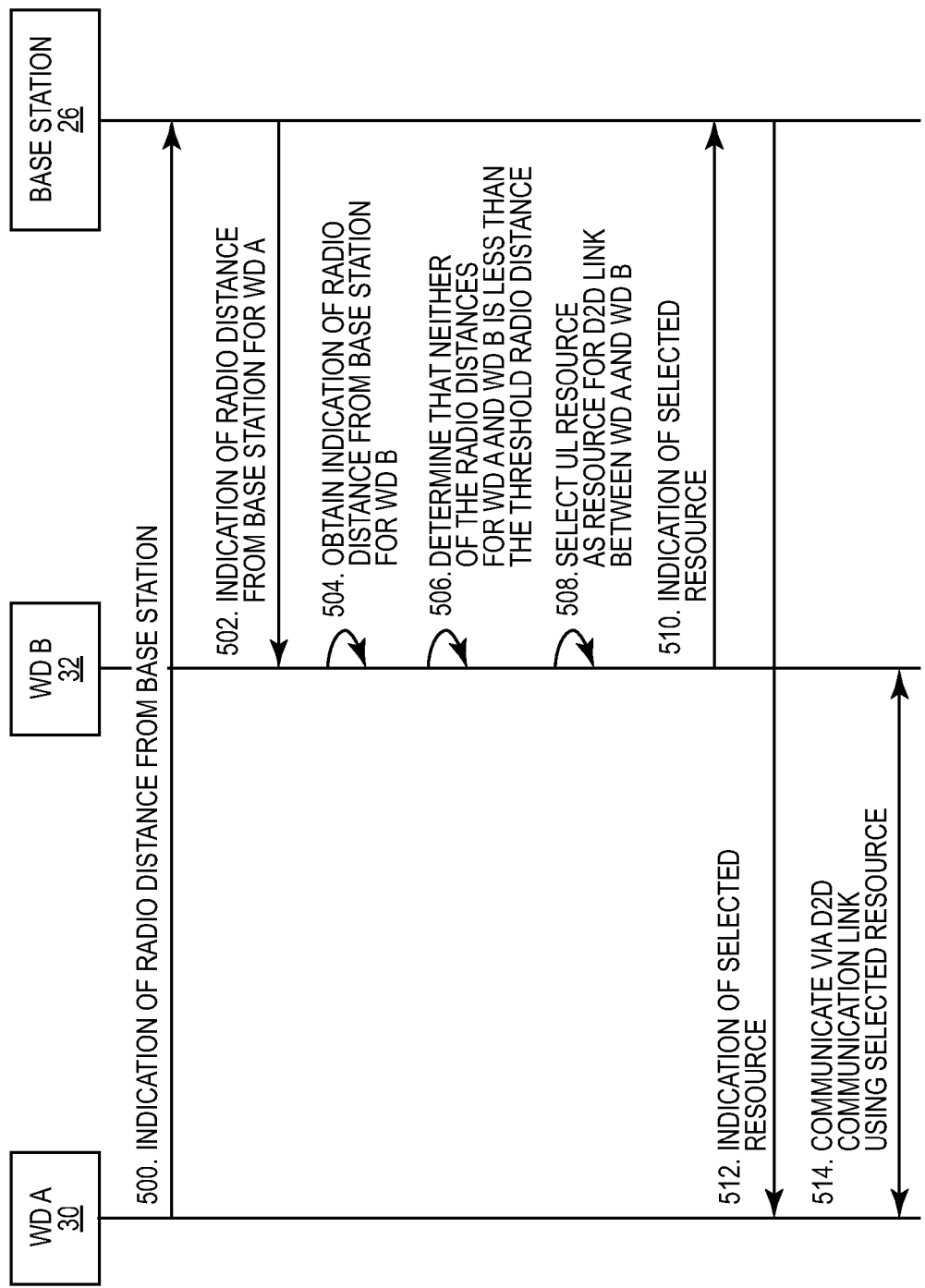
Figure 10:
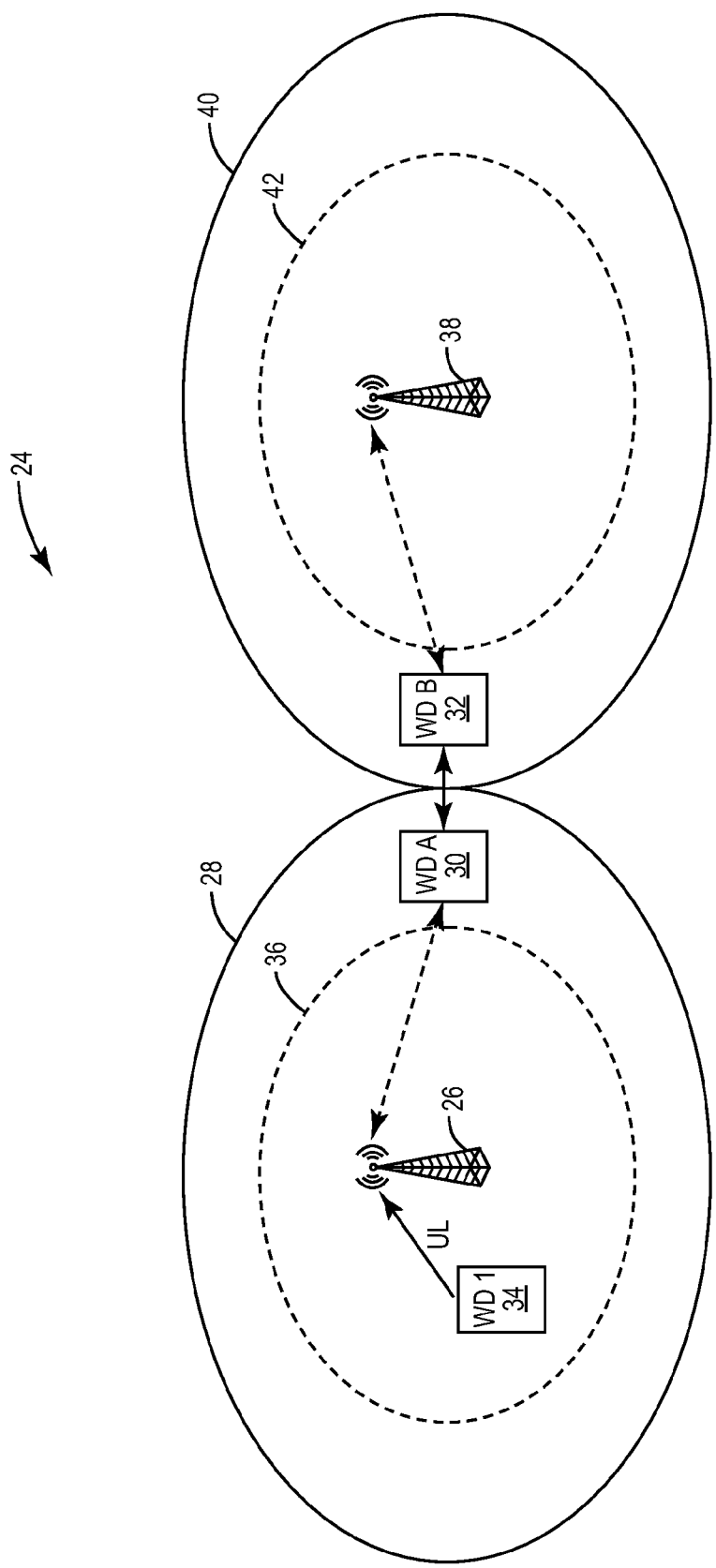
Figure 11:
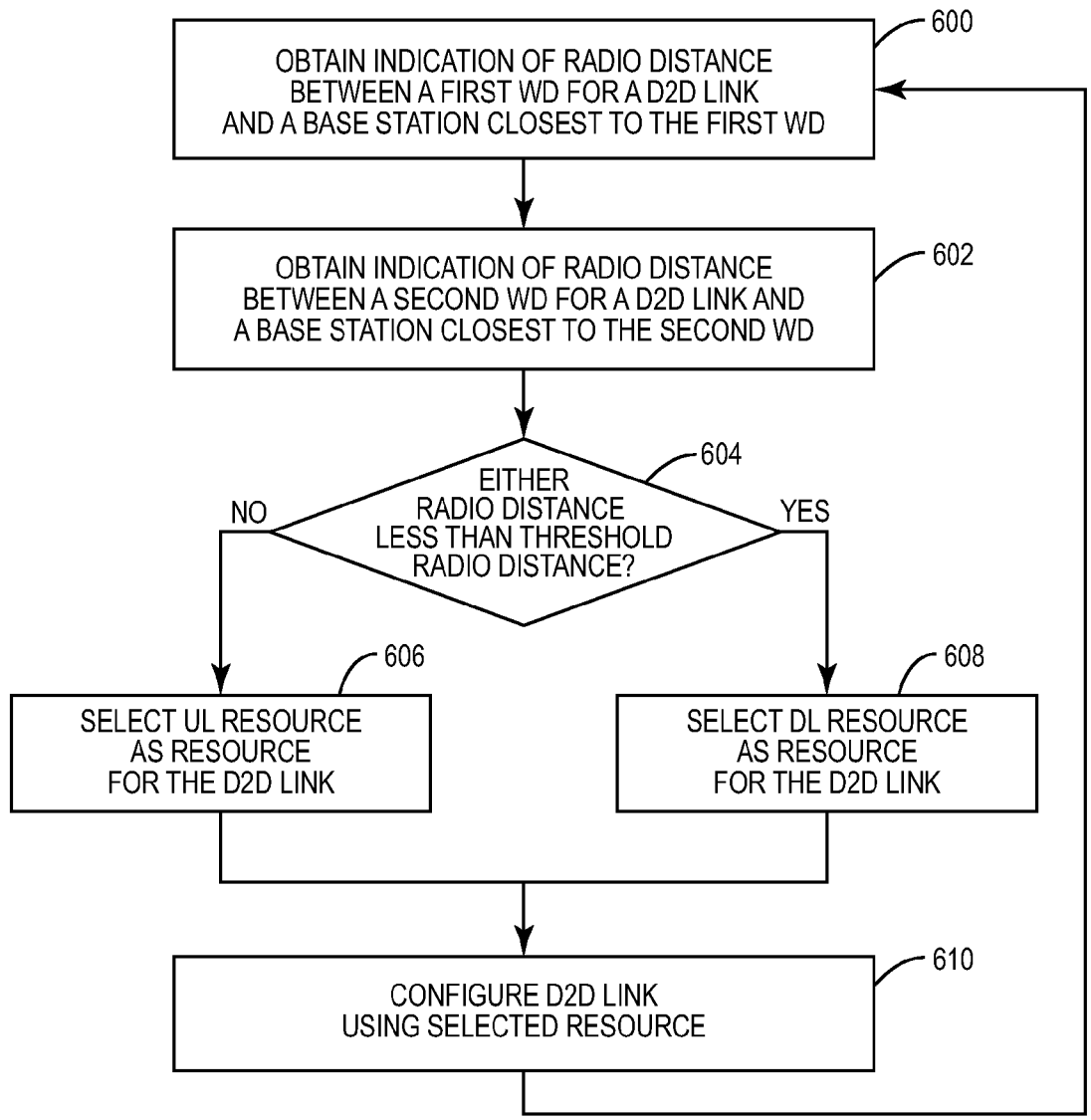
Figure 12:
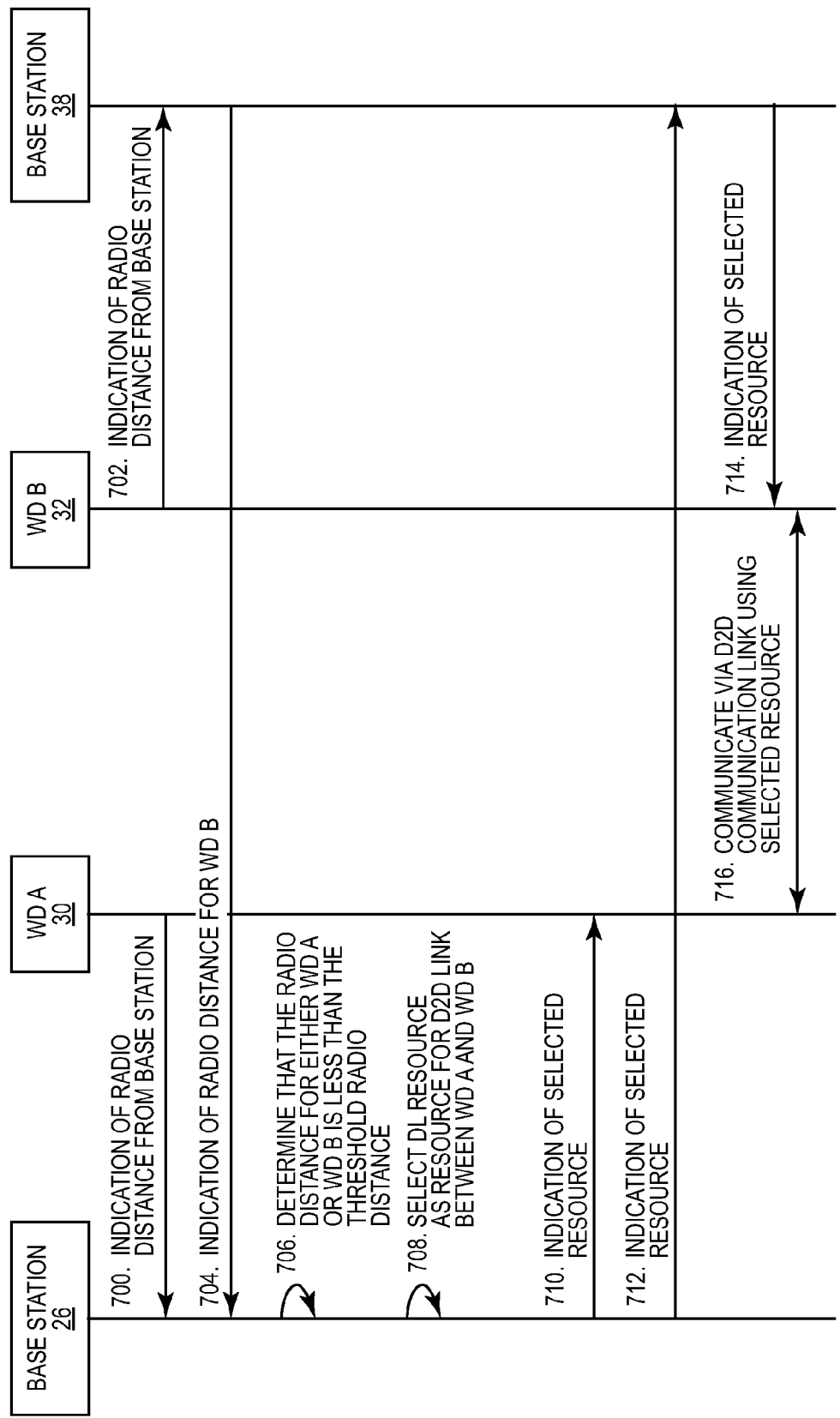
Figure 13:
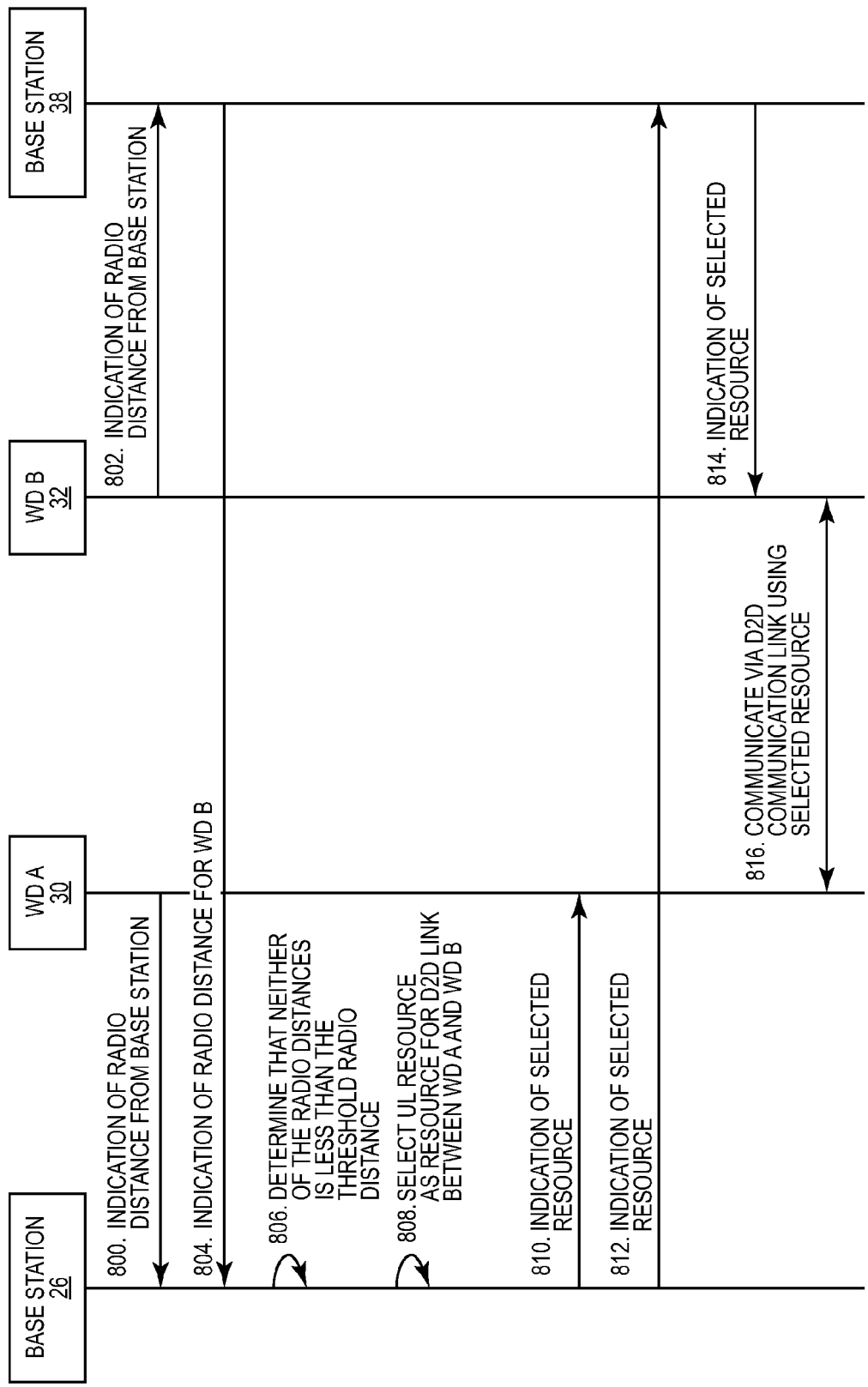
Figure 14:
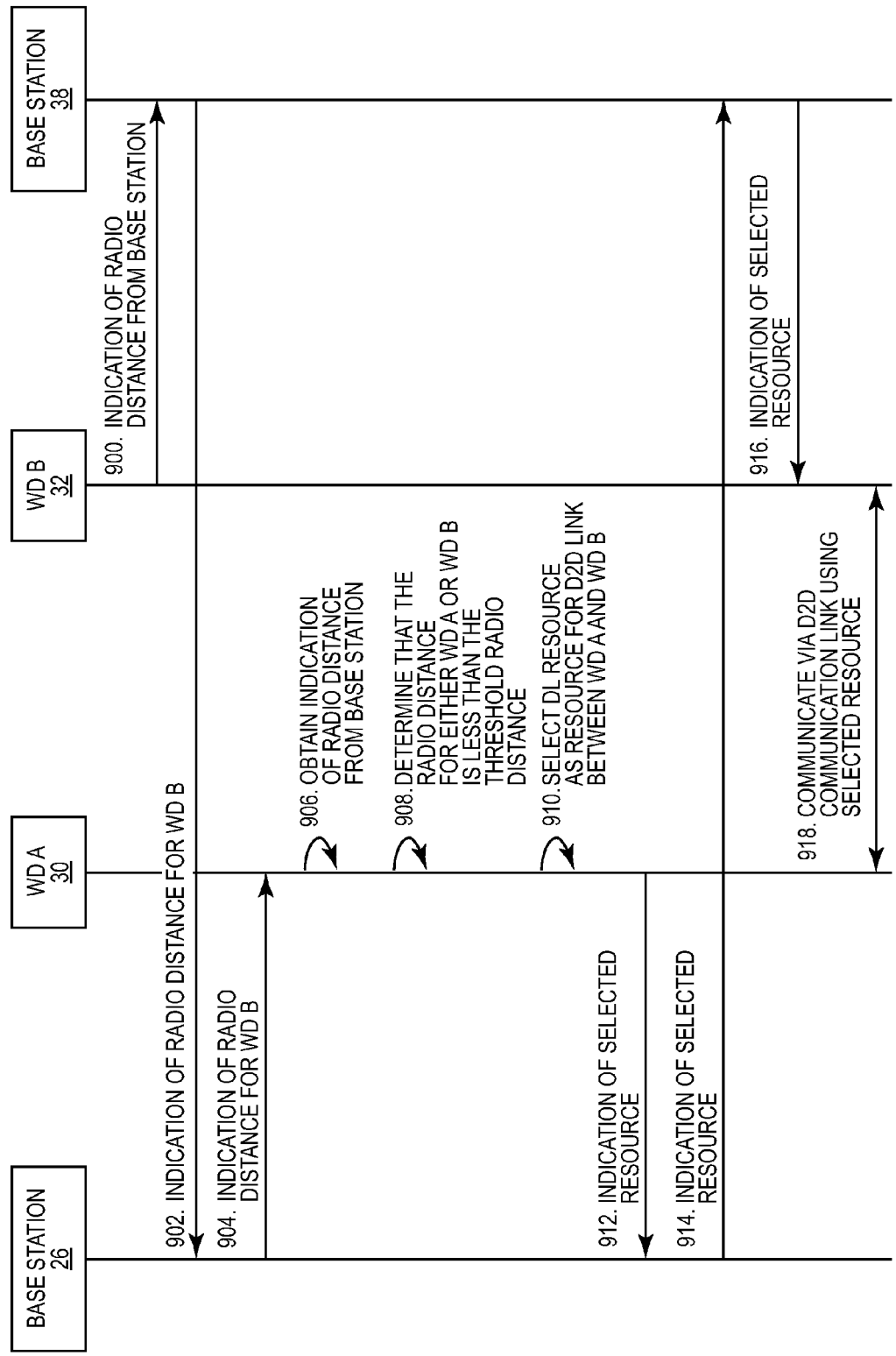
Figure 15:
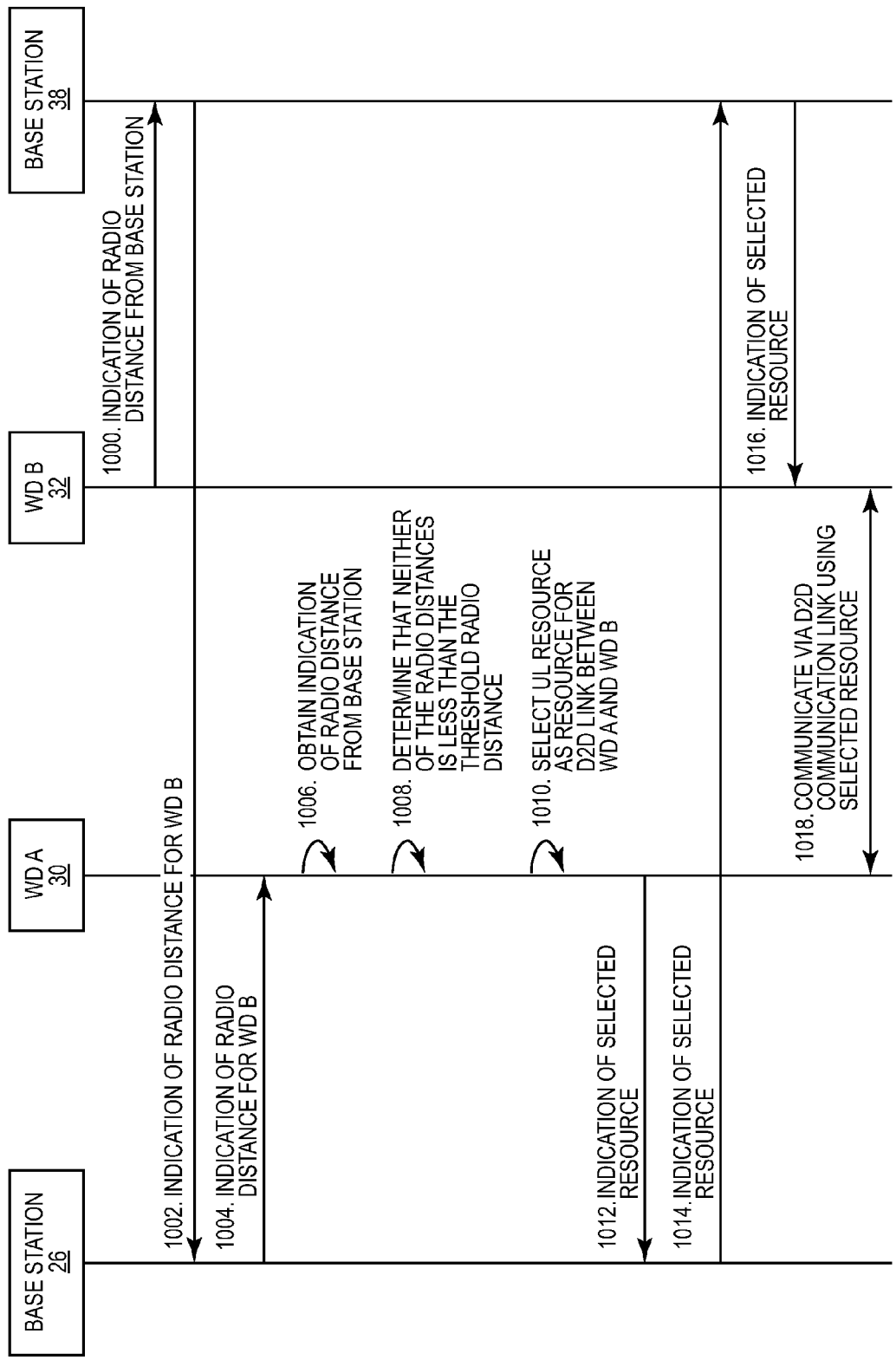
Figure 17:
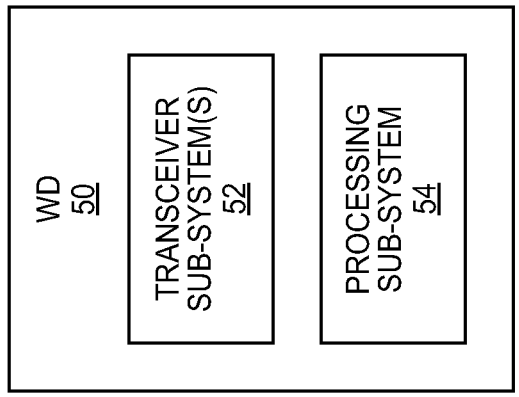
Figure 16:
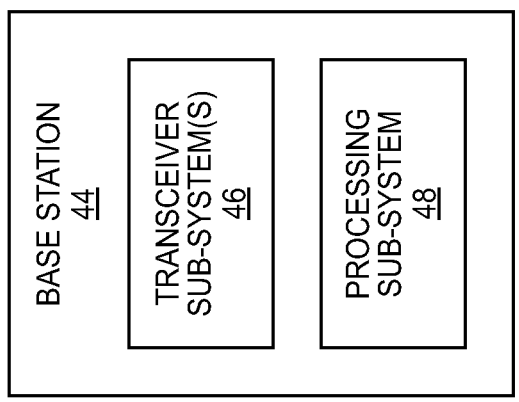

FIGS. 4A through 4C graphically illustrate a resource selection scheme for a direct D2D communication link in a cellular communication network that minimizes, or at least substantially reduces, intra-cell interference according to one embodiment of the present disclosure;

FIG. 5 is a flow chart for a process for selecting resources for a direct D2D communication link in a cellular communication network according to one embodiment of the present disclosure;

FIGS. 6 and 7 are diagrams that illustrate an embodiment in which a base station in the cellular communication network performs the process of FIG. 5 according to one embodiment of the present disclosure;

FIGS. 8 and 9 are diagrams that illustrate an embodiment in which a wireless device in the cellular communication network performs the process of FIG. 5 according to one embodiment of the present disclosure;

FIG. 10 graphically illustrates a resource selection scheme for a direct D2D communication link in a cellular communication network that reduces inter-cell interference according to one embodiment of the present disclosure;

FIG. 11 is a flow chart for a process for selecting resources for a direct D2D communication link in a cellular communication network according to another embodiment of the present disclosure;

FIGS. 12 and 13 are diagrams that illustrate an embodiment in which a base station in the cellular communication network performs the process of FIG. 11 according to one embodiment of the present disclosure;

FIGS. 14 and 15 are diagrams that illustrate an embodiment in which a wireless device in the cellular communication network performs the process of FIG. 11 according to one embodiment of the present disclosure;

FIG. 16 is a block diagram of a base station according to one embodiment of the present disclosure; and FIG. 17 is a block diagram of a wireless device according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods are disclosed for selecting resources for direct device to device (D2D) communications in a cellular communication network. Preferably, resources for the direct D2D communications are selected to minimize, or at least substantially reduce, interference that results from the direct D2D communications in the cellular communication network. In one embodiment, a downlink resource of the cellular communication network is selected as a resource for a direct D2D communication link between a first wireless device and a second wireless device if at least one of the first wireless device and the second wireless device is less than a predefined threshold radio distance from a closest base station in the cellular communication network. Otherwise, an uplink resource of the cellular communication network is selected as a resource for the direct D2D communication link between the first and second wireless devices.

FIGS. 4A through 4C graphically illustrate a process for selecting resources for D2D communications in a cellular communication network 24 according to one embodiment of the present disclosure. By selecting resources for D2D communications in this manner, interference resulting from D2D communications is minimized, or at least substantially reduced. More specifically, as illustrated in FIG. 4A, the cellular communication network 24 includes a base station 26 that serves a corresponding cell 28 of the cellular communication network 24. While only one base station 26 is illustrated, the cellular communication network 24 includes numerous base stations 26 serving corresponding cells 28. In one particular non-limiting embodiment, the base station 26 is an eNodeB (eNB) in a Long Term Evolution (LTE) cellular communication network. However, the base station 26 is not limited thereto.

In this example, wireless devices (WDs) 30 and 32 are located within the cell 28 and are in close proximity to one another. As used herein, two wireless devices are "in close proximity to one another" when the two wireless devices are sufficiently close to form a direct D2D communication link. When the wireless devices 30 and 32 desire to establish a bearer link, rather than establishing the bearer link through the base station 26, the cellular communication network 24 assists the wireless devices 30 and 32 to establish a direct D2D communication link (i.e., a direct D2D bearer link) between one another. More specifically, through signaling with the base station 26 or some other mechanism, the wireless devices 30 and 32 discover one another using a D2D device discovery process and then establish a D2D communication link directly between one another rather than through the base station 26.

The D2D communication link between the wireless devices 30 and 32 is a Time Division Duplex (TDD), or half-duplex, communication link that utilizes either an uplink resource or downlink resource of the cellular communication network 24. In the examples discussed herein, the uplink resource and the downlink resource are the same uplink resource and downlink resource used by a wireless device 34 located in the cell 28. As such, there is a loss of orthogonality within the cell 28. As used herein, an uplink resource is a physical resource utilized by the cellular communication network 24 for uplinks from wireless devices to base stations (e.g., a physical resource utilized for the uplink from the wireless device 34 to the base station 26). In one particular embodiment, the cellular communication network 24 is a Frequency Division Duplexing (FDD) network that utilizes different frequency bands for uplinks and downlinks, and the uplink resource is a physical resource in the uplink frequency band. In another embodiment, the cellular communication network 24 is a TDD network that utilizes the same frequency band but different time slots for uplink and downlink, and the uplink resource is an uplink time slot. Similarly, a downlink resource is a physical resource utilized by the cellular communication network 24 for downlinks from base stations to wireless devices (e.g., a physical resource utilized for the downlink from the base station 26 to the wireless device 34). In one particular embodiment, the cellular communication network 24 is a FDD network that utilizes different frequency bands for uplink and downlink, and the downlink resource is a physical resource in the downlink frequency band. In another embodiment, the cellular communication network 24 is a TDD network that utilizes the same frequency band but different time slots for uplink and downlink, and the downlink resource is a downlink time slot.

As discussed below in detail, a resource for the D2D communication link between the wireless devices 30 and 32 is selected based on radio distances between the wireless devices 30 and 32, respectively, and the base station 26. As used herein, a radio distance is a term that represents a link quality between two nodes rather than a Euclidean distance between the two nodes. The greater the radio distance, the lower the link quality. For example, radio distance may be represented as Reference Signal Received Power (RSRP) value such as that measured by a wireless device in an LTE cellular communication network, a Reference Signal Received Quality (RSRQ) value such as that measured by a wireless device in an LTE cellular communication network, a Channel Quality Index (CQI) value such as that measured by a wireless device in an LTE cellular communication network, an Received Signal Strength Indicator (RSSI) value measured by the wireless device 30 for a signal transmitted from the base station 26 to the wireless device 30, Channel State Information (CSI) such as that generated a wireless device in an LTE network, an Uplink Sounding Reference Signal (UL SRS) transmitted by the wireless device 30, a Signal to Interference plus Noise Ratio (SINR) value, or the like, or any combination thereof.

As illustrated in FIG. 4A, if the radio distance between the wireless device 30 and the base station 26 and the radio distance between the wireless device 32 and the base station 26 are both less than a predefined threshold radio distance 36 from the base station 26, then the downlink resource of the cellular communication network 24 is selected as the resource for the D2D communication link between the wireless devices 30 and 32. Again, the downlink resource is the same downlink resource used by the wireless device 34. By doing so, interference to the uplink to the base station 26 from the wireless device 34 caused by the D2D communication link between the wireless devices 30 and 32 is avoided. More specifically, if the D2D communication link were to use the uplink resource of the wireless device 34 while the wireless devices 30 and 32 are close to the base station 26, uplink interference would be substantial. By utilizing the downlink resource when close to the base station 26, uplink interference resulting from the D2D communication link between the wireless devices 30 and 32 is avoided when the uplink interference would otherwise be strongest.

Conversely, if the radio distance between the wireless device 30 and the base station 26 and the radio distance between the wireless device 32 and the base station 26 are both greater than the predefined threshold radio distance 36 from the base station 26, then the uplink resource of the cellular communication network 24 is selected as the resource for the D2D communication link between the wireless devices 30 and 32, as illustrated in FIG. 4B. Again, the uplink resource is the same uplink resource used by the wireless device 34. By doing so, interference to the downlink from the base station 26 to the wireless device 34 caused by the D2D communication link between the wireless devices 30 and 32 is avoided. More specifically, if the D2D communication link were to use the same downlink resource of the wireless device 34 while the wireless devices 30 and 32 are far from the base station 26, there would be downlink interference caused for the downlink to the wireless device 34 which would become more substantial as the wireless device 34 moves closer to the wireless devices 30 and 32. By utilizing the uplink resource when far from the base station 26, downlink interference resulting from the D2D communication link between the wireless devices 30 and 32 is avoided when the downlink interference would otherwise be most problematic.

Lastly, FIG. 4C illustrates a scenario where the radio distance between the wireless device 30 and the base station 26 is less than the predefined threshold radio distance 36 but the radio distance between the wireless device 32 and the base station 26 is greater than the predefined threshold radio distance 36. In this embodiment, the downlink resource of the cellular communication network 24 is selected for the D2D communication link if either of the radio distances is less than the predefined threshold radio distance 36. As such, the downlink resource is selected for the D2D communication link between the wireless devices 30 and 32.

FIG. 5 is a flow chart illustrating a process for selecting one or more resources for the D2D communication link between the wireless devices 30 and 32 according to one embodiment of the present disclosure. This process may be performed by the base station 26, one of the wireless devices 30 or 32 for the D2D communication link, or potentially some other network node in the cellular communication network 24. First, the network node (i.e., the base station 26, one of the wireless devices 30 or 32, or some other network node in the cellular communication network 24) obtains an indication of a radio distance between a first wireless device for a D2D communication link, which in this case is the wireless device 30, and the base station 26 (step 100). In one embodiment, the indication of the radio distance between the wireless device 30 and the base station 26 is an indication of link quality for a radio link between the base station 26 and the wireless device 30. For example, the indication of the radio distance between the wireless device 30 and the base station 26 may be a RSRP value such as that measured by a wireless device in an LTE cellular communication network, a RSRQ value such as that measured by a wireless device in an LTE cellular communication network, a CQI value such as that measured by a wireless device in an LTE cellular communication network, a RSSI value measured by the wireless device 30 for a signal transmitted from the base station 26 to the wireless device 30, CSI such as that generated a wireless device in an LTE network, an UL SRS transmitted by the wireless device 30, SINR value, or the like, or any combination thereof.

In addition, the network node obtains an indication of a radio distance between a second wireless device for the D2D communication link, which in this case is the wireless device 32, and the base station 26 (step 102). As discussed above for the wireless device 30, in one embodiment, the indication of the radio distance between the wireless device 32 and the base station 26 is an indication of link quality for a radio link between the base station 26 and the wireless device 32. The network node then determines whether the radio distance between the wireless device 30 and the base station 26 or the radio distance between the wireless device 32 and the base station 26 is less than the predefined threshold radio distance 36 (step 104). For example, in one particular embodiment, the indications of the radio distances between the base station 26 and the wireless devices 30 and 32, respectively, are corresponding RSRP values. Then, in step 104, the network node compares the RSRP values for the wireless devices 30 and 32 to a threshold RSRP value that represents the predefined threshold radio distance 36. The network node then determines whether either RSRP value for the wireless device 30 or the RSRP value for the wireless device 32 is less than the threshold RSRP value. In a similar manner, other metrics such as RSRQ, CQI, RSSI, CSI, or UL SRS may be used.

If the network node determines that neither the radio distance between the base station 26 and the wireless device 30 nor the radio distance between the base station 26 and the wireless device 32 is less than the predefined threshold radio distance 36, then the network node selects an uplink (UL) resource of the cellular communication network 24 as a corresponding resource for the D2D communication link between the wireless device 30 and the wireless device 32 (step 106). Again, the UL resource of the cellular communication network 24 is preferably the same UL resource used by the wireless device 34 located in the cell 28. Conversely, if the network node determines that either the radio distance between the base station 26 and the wireless device 30 or the radio distance between the base station 26 and the wireless device 32 is less than the threshold radio distance 36, then the network node selects a downlink (DL) resource of the cellular communication network 24 as a corresponding resource for the D2D communication link between the wireless device 30 and the wireless device 32 (step 108). Again, the DL resource of the cellular communication network 24 is preferably the same DL resource used by the wireless device 34 located in the cell 28.

Lastly, whether proceeding from step 106 or 108, the D2D communication link between the wireless device 30 and the wireless device 32 is configured using the selected resource (step 110). The process then returns to step 100 and is repeated. In this manner, the resource used for the D2D communication link is dynamically configured. Thus, if the wireless device 30 and/or the wireless device 32 move such that the decision in step 104 changes, the resource selected for the D2D communication link also changes. Therefore, for example, if radio distances between the wireless devices 30 and 32 and the base station 26 are both initially greater than the predefined threshold radio distance 36 but the wireless devices 30 and 32 then move such that the radio distance from one of the wireless devices 30 and 32 is less than the predefined threshold radio distance 36, then the resource select for the D2D communication link changes from the UL resource of the cellular communication network 24 to the DL resource of the cellular communication network 24.

FIG. 6 is a diagram that illustrates the operation of the base station 26 to perform the process of FIG. 5 according to one embodiment of the present disclosure. As illustrated, the wireless device 30 provides, to the base station 26, an indication of the radio distance of the wireless device 30 from the base station 26 (step 200). Likewise, the wireless device 32 provides, to the base station 26, an indication of the radio distance of the wireless device 32 from the base station 26 (step 202). In this example, the base station 26 then determines that the radio distance for either the wireless device 30 or the wireless device 32 is less than the predefined threshold radio distance 36 based on the indications of the radio distances for the wireless devices 30 and 32 received in steps 200 and 202 (step 204). As such, the base station 26 selects the DL resource of the cellular communication network 24 as the resource for the D2D communication link between the wireless devices 30 and 32 (step 206). Then, the base station 26 configures the D2D communication link using the selected resource by, in this embodiment, sending an indication of the selected resource for the D2D communication link to both the wireless device 30 and the wireless device 32 (steps 208 and 210). The indication of the selected resource may be any suitable information for conveying the selected resource to the wireless devices 30 and 32. The wireless devices 30 and 32 then communicate via the D2D communication link using the selected resource (step 212).

FIG. 7 is a diagram that illustrates the operation of the base station 26 to perform the process of FIG. 5 according to one embodiment of the present disclosure. As illustrated, the wireless device 30 provides, to the base station 26, an indication of the radio distance of the wireless device 30 from the base station 26 (step 300). Likewise, the wireless device 32 provides, to the base station 26, an indication of the radio distance of the wireless device 32 from the base station 26 (step 302). In this example, the base station 26 then determines that neither of the radio distances for the wireless devices 30 and 32 is less than the predefined threshold radio distance 36 based on the indications of the radio distances for the wireless devices 30 and 32 received in steps 300 and 302 (step 304). As such, the base station 26 selects the UL resource of the cellular communication network 24 as the resource for the D2D communication link between the wireless devices 30 and 32 (step 306). Then, the base station 26 configures the D2D communication link using the selected resource by, in this embodiment, sending an indication of the selected resource for the D2D communication link to both the wireless device 30 and the wireless device 32 (steps 308 and 310). The indication of the selected resource may be any suitable information for conveying the selected resource to the wireless devices 30 and 32. The wireless devices 30 and 32 then communicate via the D2D communication link using the selected resource (step 312).

FIGS. 8 and 9 are similar to FIGS. 6 and 7 but where the process of FIG. 5 is performed by one of the wireless devices 30 and 32 for the D2D communication link. More specifically, FIG. 8 is a diagram that illustrates the operation of the wireless device 32 to perform the process of FIG. 5 according to one embodiment of the present disclosure. Note that the wireless device 30 may alternatively perform the process of FIG. 5. As illustrated, the wireless device 30 provides, to the base station 26, an indication of the radio distance of the wireless device 30 from the base station 26 (step 400). The base station 26 then provides the indication of the radio distance of the wireless device 30 from the base station 26 to the wireless device 32 (step 402). Alternatively, the wireless device 30 may provide the indication of the radio distance between the wireless device 30 and the base station 26 to the wireless device 32 via a direct communication link between the wireless devices 30 and 32 using some other communication mechanism (e.g., a Bluetooth® communication link, a direct WiFi® communication link, or the like).

In addition, the wireless device 32 measures, generates, or otherwise obtains an indication of the radio distance of the wireless device 32 from the base station 26 (step 404). In this example, the wireless device 32 then determines that the radio distance for either the wireless device 30 or the wireless device 32 is less than the predefined threshold radio distance 36 based on the indications of the radio distances for the wireless devices 30 and 32 (step 406). As such, the wireless device 32 selects the DL resource of the cellular communication network 24 as the resource for the D2D communication link between the wireless devices 30 and 32 (step 408). Then, the wireless device 32 configures the D2D communication link using the selected resource by, in this embodiment, sending an indication of the selected resource for the D2D communication link to the base station 26, which in turn provides the indication of the selected resource for the D2D communication link to the wireless device 30 (steps 410 and 412). The indication of the selected resource may be any suitable information for conveying the selected resource to the wireless device 30. Alternatively, the wireless device 32 may provide the indication of the selected resource to the wireless device 30 via a direct communication link between the wireless devices 30 and 32 using some other communication mechanism (e.g., a Bluetooth® communication link, a direct WiFi® communication link, or the like). The wireless devices 30 and 32 then communicate via the D2D communication link using the selected resource (step 414).

FIG. 9 is a diagram that illustrates the operation of the wireless device 32 to perform the process of FIG. 5 according to one embodiment of the present disclosure. Note that the wireless device 30 may alternatively perform the process of FIG. 5. As illustrated, the wireless device 30 provides, to the base station 26, an indication of the radio distance of the wireless device 30 from the base station 26 (step 500). The base station 26 then provides the indication of the radio distance of the wireless device 30 from the base station 26 to the wireless device 32 (step 502). Alternatively, the wireless device 30 may provide the indication of the radio distance between the wireless device 30 and the base station 26 to the wireless device 32 via a direct communication link between the wireless devices 30 and 32 using some other communication mechanism (e.g., a Bluetooth® communication link, a direct WiFi® communication link, or the like).

In addition, the wireless device 32 measures, generates, or otherwise obtains an indication of the radio distance of the wireless device 32 from the base station 26 (step 504). In this example, the wireless device 32 then determines that the radio distance for neither the wireless device 30 nor the wireless device 32 is less than the predefined threshold radio distance 36 based on the indications of the radio distances for the wireless devices 30 and 32 (step 506). As such, the wireless device 32 selects the UL resource of the cellular communication network 24 as the resource for the D2D communication link between the wireless devices 30 and 32 (step 508). Then, the wireless device 32 configures the D2D communication link using the selected resource by, in this embodiment, sending an indication of the selected resource for the D2D communication link to the base station 26, which in turn provides the indication of the selected resource for the D2D communication link to the wireless device 30 (steps 510 and 512). The indication of the selected resource may be any suitable information for conveying the selected resource to the wireless device 30. Alternatively, the wireless device 32 may provide the indication of the selected resource to the wireless device 30 via a direct communication link between the wireless devices 30 and 32 using some other communication mechanism (e.g., a Bluetooth® communication link, a direct WiFi® communication link, or the like). The wireless devices 30 and 32 then communicate via the D2D communication link using the selected resource (step 514).

Thus far, the description has focused on the scenario where both the wireless device 30 and the wireless device 32 are located within the same cell 28 of the cellular communication network 24. FIGS. 10 through 15 illustrate embodiments where the wireless device 30 and the wireless device 32 are in neighboring cells in the cellular communication network 24. More specifically, FIG. 10 graphically illustrates a resource selection scheme for the D2D communication link between the wireless devices 30 and 32 when the wireless devices 30 and 32 are located in neighboring cells of the cellular communication network 24 according to another embodiment of the present disclosure. As illustrated, the cellular communication network 24 includes the base station 26 as described above. In addition, the cellular communication network 24 includes a base station 38 that serves a corresponding cell 40 of the cellular communication network 24 that neighbors the cell 28 served by the base station 26. As such, the base stations 26 and 38 are referred to herein as neighboring base stations.

In this embodiment, the selection of resources for the D2D communication link between the wireless devices 30 and 32 is based on a radio distance between the wireless device 30 and the base station 26, which is the base station that is closest to the wireless device 30 in terms of radio distance, and a radio distance between the wireless device 32 and the base station 38, which is the base station that is closest to the wireless device 32 in terms of radio distance. In the example of FIG. 10, the radio distance of the wireless device 30 from the base station 26 is greater than the predefined threshold radio distance 36 from the base station 26, and the radio distance of the wireless device 32 from the base station 38 is greater than a predefined threshold radio distance 42 from the base station 38. As such, the UL resource of the cellular communication network 24 is selected for the D2D communication link between the wireless devices 30 and 32.

FIG. 11 is a flow chart illustrating a process for selecting the resource for the D2D communication link between the wireless devices 30 and 32 according to one embodiment of the present disclosure. This process may be performed by the base station 26, the base station 38, one of the wireless devices 30 or 32 for the D2D communication link, or potentially some other network node in the cellular communication network 24. Notably, the process of FIG. 11 is similar to that of FIG. 5, but the process of FIG. 11 can be utilized to select the resource for the D2D communication link when the wireless devices 30 and 32 are located in the same cell or in neighboring cells.

First, the network node (i.e., the base station 26, the base station 38, one of the wireless devices 30 or 32, or some other network node in the cellular communication network 24)

obtains an indication of a radio distance between a first wireless device for a D2D communication link, which in this case is the wireless device 30, and the base station that is closest to the wireless device 30 in terms of radio distance (step 600). For the discussion of FIG. 11 and the following discussion of FIGS. 12 through 15, it is assumed that the base station 26 is the base station that is closest to the wireless device 30. However, the present disclosure is not limited thereto. As discussed above, in one embodiment, the indication of the radio distance between the wireless device 30 and the base station 26 is an indication of link quality for a radio link between the base station 26 and the wireless device 30.

In addition, the network node obtains an indication of a radio distance between a second wireless device for the D2D communication link, which in this case is the wireless device 32, and the base station that is closest to the wireless device 32 in terms of radio distance (step 602). For the discussion of FIG. 11 and the following discussion of FIGS. 12 through 15, it is assumed that the base station 38 is the base station that is closest to the wireless device 32. However, the present disclosure is not limited thereto. As discussed above for the wireless device 30, in one embodiment, the indication of the radio distance between the wireless device 32 and the base station 38 is an indication of link quality for a radio link between the base station 38 and the wireless device 32.

The network node then determines whether the radio distance between the wireless device 30 and the base station 26 is less than the predefined threshold radio distance 36 or the radio distance between the wireless device 32 and the base station 38 is less than the predefined threshold radio distance 42 (step 604). Notably, the predefined threshold radio distances 36 and 42 are preferably the same predefined threshold radio distance. However, the present disclosure is not limited thereto. As one example of the decision in step 604, the indications of the radio distances between the base station 26 and the wireless device 30 and the base station 38 and the wireless device 32, respectively, may be corresponding RSRP values. Then, in step 604, the network node compares the RSRP values for the wireless devices 30 and 32 to threshold RSRP values that represent the predefined threshold radio distances 36 and 42, respectively. The network node then determines whether either RSRP value for the wireless device 30 or the RSRP value for the wireless device 32 is less than the corresponding threshold RSRP value. In a similar manner, other metrics such as RSRQ, CQI, RSSI, CSI, or UL SRS may be used.

If the network node determines that the radio distance between the base station 26 and the wireless device 30 is not less than the predefined threshold radio distance 36 and the radio distance between the base station 38 and the wireless device 32 is not less than the predefined threshold radio distance 42, then the network node selects the UL resource of the cellular communication network 24 as the corresponding resource for the D2D communication link between the wireless device 30 and the wireless device 32 (step 606). Again, the UL resource of the cellular communication network 24 is preferably the same UL resource used by the wireless device 34 and, potentially, another wireless device located in the neighboring cell 40. If the network node determines that either the radio distance between the base station 26 and the wireless device 30 is less than the predefined threshold radio distance 36 or the radio distance between the base station 38 and the wireless device 32 is less than the predefined threshold radio distance 42, then the network node selects the DL resource of the cellular communication network 24 as the corresponding resource for the D2D communication link between the wireless device 30 and the wireless device 32 (step 608). Again, the DL resource of the cellular communication network 24 is preferably the same DL resource used by the wireless device 34 and, potentially, another wireless device located in the neighboring cell 40.

Lastly, whether proceeding from step 606 or 608, the D2D communication link between the wireless device 30 and the wireless device 32 is configured using the selected resource (step 610). The process then returns to step 600 and is repeated. In this manner, the resource used for the D2D communication link is dynamically configured. Thus, if the wireless device 30 and/or the wireless device 32 move such that the decision in step 604 changes, the resource selected for the D2D communication link also changes.

FIGS. 12 and 13 illustrate embodiments where the base station 26 performs the process of FIG. 11. However, the base station 38 may alternatively perform the process of FIG. 11. More specifically, FIG. 12 is a diagram that illustrates the operation of the base station 26 to perform the process of FIG. 11 according to one embodiment of the present disclosure. As illustrated, the wireless device 30 provides, to the base station 26, an indication of the radio distance of the wireless device 30 from the base station 26 (step 700). Likewise, the wireless device 32 provides, to the base station 38, an indication of the radio distance of the wireless device 32 from the base station 38 (step 702). The base station 38 then sends the indication of the radio distance between the wireless device 32 and the base station 38 to the base station 26 (step 704). Notably, the base stations 26 and 38 are connected via a wired or wireless interface. For example, for LTE, the X2 interface may be used for communication between the base stations 26 and 38.

In this example, the base station 26 then determines that the radio distance for the wireless device 30 is less than the predefined threshold radio distance 36 or the radio distance for the wireless device 32 is less than the predefined threshold radio distance 42 based on the indications of the radio distances for the wireless devices 30 and 32 received in steps 700 and 704 (step 706). As such, the base station 26 selects the DL resource of the cellular communication network 24 as the resource for the D2D communication link between the wireless devices 30 and 32 (step 708). Then, the base station 26 configures the D2D communication link using the selected resource by, in this embodiment, sending an indication of the selected resource for the D2D communication link to the wireless device 30 (step 710) and sending the indication of the selected resource for the D2D communication link to the base station 38 (step 712), which in turn sends the indication of the selected resource for the D2D communication link to the wireless device 32 (step 714). The indication of the selected resource may be any suitable information for conveying the selected resource to the wireless devices 30 and 32. The wireless devices 30 and 32 then communicate via the D2D communication link using the selected resource (step 716).

FIG. 13 is a diagram that illustrates the operation of the base station 26 to perform the process of FIG. 11 according to one embodiment of the present disclosure. As illustrated, the wireless device 30 provides, to the base station 26, an indication of the radio distance of the wireless device 30 from the base station 26 (step 800). Likewise, the wireless device 32 provides, to the base station 38, an indication of the radio distance of the wireless device 32 from the base station 38 (step 802). The base station 38 then sends the indication of the radio distance between the wireless device 32 and the base station 38 to the base station 26 (step 804). Notably, the base stations 26 and 38 are connected via a wired or wireless interface. For example, for LTE, the X2 interface may be used for communication between the base stations 26 and 38.

In this example, the base station 26 then determines that neither the radio distance for the wireless device 30 or the radio distance for the wireless device 32 is less than the corresponding predefined threshold radio distance 36, 42 based on the indications of the radio distances for the wireless devices 30 and 32 received in steps 800 and 804 (step 806). As such, the base station 26 selects the UL resource of the cellular communication network 24 as the resource for the D2D communication link between the wireless devices 30 and 32 (step 808). Then, the base station 26 configures the D2D communication link using the selected resource by, in this embodiment, sending an indication of the selected resource for the D2D communication link to the wireless device 30 (step 810) and sending the indication of the selected resource for the D2D communication link to the base station 38 (step 812), which in turn sends the indication of the selected resource for the D2D communication link to the wireless device 32 (step 814). The indication of the selected resource may be any suitable information for conveying the selected resource to the wireless devices 30 and 32. The wireless devices 30 and 32 then communicate via the D2D communication link using the selected resource (step 816).

FIGS. 14 and 15 are similar to FIGS. 12 and 13 but where the process of FIG. 11 is performed by one of the wireless devices 30 and 32 for the D2D communication link. More specifically, FIG. 14 is a diagram that illustrates the operation of the wireless device 30 to perform the process of FIG. 11 according to one embodiment of the present disclosure. Note that the wireless device 32 may alternatively perform the process of FIG. 11. As illustrated, the wireless device 32 provides, to the base station 38, an indication of the radio distance of the wireless device 32 from the base station 38 (step 900). The base station 900 then provides the indication of the radio distance of the wireless device 32 from the base station 38 to the base station 26 (step 902), which in turn sends the indication of the radio distance of the wireless device 32 from the base station 38 to the wireless device 30 (step 904). Alternatively, the wireless device 32 may provide the indication of the radio distance between the wireless device 32 and the base station 38 to the wireless device 30 via a direct communication link between the wireless devices 30 and 32 using some other communication mechanism (e.g., a Bluetooth® communication link, a direct WiFi® communication link, or the like).

In addition, the wireless device 30 measures, generates, or otherwise obtains an indication of the radio distance of the wireless device 30 from the base station 26 (step 906). In this example, the wireless device 30 then determines that the radio distance for either the wireless device 30 or the wireless device 32 is less than the corresponding predefined threshold radio distance 36, 42 based on the indications of the radio distances for the wireless devices 30 and 32 (step 908). As such, the wireless device 30 selects the DL resource of the cellular communication network 24 as the resource for the D2D communication link between the wireless devices 30 and 32 (step 910). Then, the wireless device 30 configures the D2D communication link using the selected resource by, in this embodiment, sending an indication of the selected resource for the D2D communication link to the base station 26 (step 912). The base station 26 then sends the indication of the selected resource for the D2D communication link to the base station 38, which in turn sends the indication of the selected resource for the D2D communication link to the wireless device 32 (steps 914 and 916). The indication of the selected resource may be any suitable information for conveying the selected resource to the wireless device 32. Alternatively, the wireless device 30 may provide the indication of the selected resource to the wireless device 32 via a direct communication link between the wireless devices 30 and 32 using some other communication mechanism (e.g., a Bluetooth® communication link, a direct WiFi® communication link, or the like). The wireless devices 30 and 32 then communicate via the D2D communication link using the selected resource (step 918).

FIG. 15 is a diagram that illustrates the operation of the wireless device 30 to perform the process of FIG. 11 according to one embodiment of the present disclosure. Note that the wireless device 32 may alternatively perform the process of FIG. 11. As illustrated, the wireless device 32 provides, to the base station 38, an indication of the radio distance of the wireless device 32 from the base station 38 (step 1000). The base station 38 then provides the indication of the radio distance of the wireless device 32 from the base station 38 to the base station 26 (step 1002), which in turn sends the indication of the radio distance of the wireless device 32 from the base station 38 to the wireless device 30 (step 1004). Alternatively, the wireless device 32 may provide the indication of the radio distance between the wireless device 32 and the base station 38 to the wireless device 30 via a direct communication link between the wireless devices 30 and 32 using some other communication mechanism (e.g., a Bluetooth® communication link, a direct WiFi® communication link, or the like).

In addition, the wireless device 30 measures, generates, or otherwise obtains an indication of the radio distance of the wireless device 30 from the base station 26 (step 1006). In this example, the wireless device 30 then determines that the radio distance for neither the wireless device 30 nor the wireless device 32 is less than the corresponding predefined threshold radio distance 36, 42 based on the indications of the radio distances for the wireless devices 30 and 32 (step 1008). As such, the wireless device 30 selects the UL resource of the cellular communication network 24 as the resource for the D2D communication link between the wireless devices 30 and 32 (step 1010). Then, the wireless device 30 configures the D2D communication link using the selected resource by, in this embodiment, sending an indication of the selected resource for the D2D communication link to the base station 26 (step 1012). The base station 26 then sends the indication of the selected resource for the D2D communication link to the base station 38, which in turn sends the indication of the selected resource for the D2D communication link to the wireless device 32 (steps 1014 and 1016). The indication of the selected resource may be any suitable information for conveying the selected resource to the wireless device 32. Alternatively, the wireless device 30 may provide the indication of the selected resource to the wireless device 32 via a direct communication link between the wireless devices 30 and 32 using some other communication mechanism (e.g., a Bluetooth® communication link, a direct WiFi® communication link, or the like). The wireless devices 30 and 32 then communicate via the D2D communication link using the selected resource (step 1018).

FIG. 16 is a block diagram of one example of a base station 44 according to one embodiment of the present disclosure. The base station 44 may be the base station 26 or the base station 38 discussed above. The base station 44 includes one or more transceiver sub-systems 46 and a processing sub-system 48. At least one of the transceiver sub-systems 46 generally includes analog and, in some embodiments, digital components for wirelessly sending and receiving messages to and from wireless devices in the cellular communication network 24. In particular embodiments, the transceiver sub-systems 46 may represent or include radio-frequency (RF) transceivers, or separate RF transmitters and receivers, capable of transmitting such messages and/or other suitable information wirelessly to wireless devices such as the wireless devices 30, 32, and 34.

The processing sub-system 48 is implemented in hardware or a combination of hardware and software. In general, the processing sub-system 48 operates to communicate with the wireless devices 30 and 32 and potentially other base stations via the transceiver sub-system(s) 46 to perform the D2D resource selection process described herein. Specifically, the processing sub-system 48 operates to, in some embodiments, obtain information indicating the radio distances of the wireless devices 30 and 32 from their closest base stations and select either the UL resource or the DL resource of the cellular communication network 24 as the resource for the D2D communication link between the wireless devices 30 and 32 based thereon.

In particular embodiments, the processing sub-system 48 may comprise, for example, one or several general-purpose or special-purpose microprocessors or other microcontrollers programmed with suitable software and/or firmware to carry out some or all of the functionality of the base station 26 or 38 described herein. In addition or alternatively, the processing sub-system 48 may comprise various digital hardware blocks (e.g., one or more Application Specific Integrated Circuits (ASICs), one or more off-the-shelf digital and analog hardware components, or a combination thereof) configured to carry out some or all of the functionality of the base station 26 or 38 described herein. Additionally, in particular embodiments, the above described functionality of base station 26 or 38 may be implemented, in whole or in part, by the processing sub-system 48 executing software or other instructions stored on a non-transitory computer-readable medium, such as random access memory (RAM), read only memory (ROM), a magnetic storage device, an optical storage device, or any other suitable type of data storage components.

FIG. 17 is a block diagram of one example of a wireless device 50 according to one embodiment of the present disclosure. The wireless device 50 may be the wireless device 30 or 32 discussed above. The wireless device 50 includes one or more transceiver sub-systems 52 and a processing sub-system 54. At least one of the transceiver sub-systems 52 generally includes analog and, in some embodiments, digital components for wirelessly sending and receiving messages to and from base stations or other wireless devices in the cellular communication network 24. In particular embodiments, the transceiver sub-systems 52 may represent or include RF transceivers, or separate RF transmitters and receivers, capable of transmitting such messages and/or other suitable information wirelessly to base stations or other wireless devices.

The processing sub-system 54 is implemented in hardware or a combination of hardware and software. In general, the processing sub-system 54 operates to communicate with the base station(s) 26, 38 via the transceiver sub-system 52 to perform the D2D resource selection process described herein. Specifically, the processing sub-system 54 operates to determine information indicating the radio distance of the wireless devices 50 from its closest base station and, in some embodiments, select either the UL resource or the DL resource of the cellular communication network 24 as the resource for the D2D communication link between the wireless device 50 and another wireless device.

In particular embodiments, the processing sub-system 54 may comprise, for example, one or several general-purpose or special-purpose microprocessors or other microcontrollers programmed with suitable software and/or firmware to carry out some or all of the functionality of the wireless device 30 or 32 described herein. In addition or alternatively, the processing sub-system 54 may comprise various digital hardware blocks (e.g., one or more ASICs, one or more off-the-shelf digital and analog hardware components, or a combination thereof) configured to carry out some or all of the functionality of the wireless device 30 or 32 described herein. Additionally, in particular embodiments, the above described functionality of the wireless devices 30 or 32 may be implemented, in whole or in part, by the processing sub-system 54 executing software or other instructions stored on a non-transitory computer-readable medium, such as RAM, ROM, a magnetic storage device, an optical storage device, or any other suitable type of data storage components.

The following acronyms are used throughout this disclosure.

ASIC Application Specific Integrated Circuit
CSI Channel State Information
CQI Channel Quality Index
D2D Device to Device
DL Downlink
eNB eNodeB
FDD Frequency Division Duplex
LTE Long Term Evolution
RAM Random Access Memory
RF Radio Frequency
ROM Read Only Memory
RSRP Reference Signal Received Power
RSRQ Reference Signal Received Quality
RSSI Received Signal Strength Indicator
TDD Time Division Duplex
WD Wireless Device
UL Uplink
UL SRS Uplink Sounding Reference Signal Those skilled in the art will recognize improvements and modifications to the preferred embodiments of the present disclosure. All such improvements and modifications are considered within the scope of the concepts disclosed herein and the claims that follow.

What is claimed is:

1. A network node configured to select resources for a direct device to device communication link between a first wireless device and a second wireless device in a cellular communication network, comprising:
 a transceiver sub-system configured to enable wireless communication; and
 a processing sub-system associated with the transceiver sub-system configured to:
  select a downlink resource of the cellular communication network as a resource for the direct device to device communication link between the first wireless device and the second wireless device if at least one of a radio distance between the first wireless device and a base station in the cellular communication network that is closest to the first wireless device and a radio distance between the second wireless device and a base station in the cellular communication network that is closest to the second wireless device is less than a predefined threshold radio distance; and
  select an uplink resource of the cellular communication network as the resource for the direct device to device communication link between the first wireless device and the second wireless device if the radio distance between the first wireless device and the base station in the cellular communication network that is closest to the first wireless device and the radio distance between the second wireless device and the base station in the cellular communication network that is closest to the second wireless device are greater than the predefined threshold radio distance.

2. The network node of claim 1 wherein the processing sub-system is further configured to:
obtain information that is indicative of the radio distance between the first wireless device and the base station in the cellular communication network that is closest to the first wireless device; and
obtain information that is indicative of the radio distance between the second wireless device and the base station in the cellular communication network that is closest to the second wireless device.

3. The network node of claim 2 wherein the processing sub-system is further configured to determine whether at least one of the radio distance between the first wireless device and the base station in the cellular communication network that is closest to the first wireless device and the radio distance between the second wireless device and the base station in the cellular communication network that is closest to the second wireless device is less than the predefined threshold radio distance based on the information that is indicative of the radio distance between the first wireless device and the base station in the cellular communication network that is closest to the first wireless device and the information that is indicative of the radio distance between the second wireless device and the base station in the cellular communication network that is closest to the second wireless device.

4. The network node of claim 2 wherein the processing sub-system is further configured to determine whether both of the radio distance between the first wireless device and the base station in the cellular communication network that is closest to the first wireless device and the radio distance between the second wireless device and the base station in the cellular communication network that is closest to the second wireless device are greater than the predefined threshold radio distance based on the information that is indicative of the radio distance between the first wireless device and the base station in the cellular communication network that is closest to the first wireless device and the information that is indicative of the radio distance between the second wireless device and the base station in the cellular communication network that is closest to the second wireless device.

5. The network node of claim 1 wherein the processing sub-system is further configured to dynamically update the resource selected for the direct device to device communication link.

6. The network node of claim 1 wherein the resource selected for the direct device to device communication link is a frequency band.

7. The network node of claim 1 wherein the resource selected for the direct device to device communication link is one or more time slots in a frequency band.

8. The network node of claim 1 wherein the network node is the base station that is closest to the first wireless device in the cellular communication network.

9. The network node of claim 8 wherein the base station that is closest to the first wireless device in the cellular communication network and the base station that is closest to the second wireless device in the cellular communication network are the same base station, and the processing sub-system is further configured to:
receive, from the first wireless device via the transceiver sub-system, information that is indicative of the radio distance between the first wireless device and the base station; and
receive, from the second wireless device via the transceiver sub-system, information that is indicative of the radio distance between the second wireless device and the base station.

10. The network node of claim 9 wherein the information that is indicative of the radio distance between the first wireless device and the base station comprises at least one of a group consisting of: an RSRP value, an RSRQ value, a CQI value, an RSSI value, and a CSI value.

11. The network node of claim 9 wherein the processing sub-system is further configured to:
determine whether at least one of the radio distance between the first wireless device and the base station and the radio distance between the second wireless device and the base station is less than the predefined threshold radio distance based on the information that is indicative of the radio distance between the first wireless device and the base station and the information that is indicative of the radio distance between the second wireless device and the base station;
select a downlink resource of the base station as the resource for the direct device to device communication link between the first wireless device and the second wireless device if at least one of the radio distance between the first wireless device and the base station and the radio distance between the second wireless device and the base station is less than the predefined threshold radio distance; and
select an uplink resource of the base station as the resource for the direct device to device communication link between the first wireless device and the second wireless device if neither of the radio distance between the first wireless device and the base station and the radio distance between the second wireless device and the base station is less than the predefined threshold radio distance.

12. The network node of claim 9 wherein the processing sub-system is further configured to:
determine that at least one of the radio distance between the first wireless device and the base station and the radio distance between the second wireless device and the base station is less than the predefined threshold radio distance based on the information that is indicative of the radio distance between the first wireless device and the base station and the information that is indicative of the radio distance between the second wireless device and the base station; and
select a downlink resource of the base station as the resource for the direct device to device communication link between the first wireless device and the second wireless device in response to determining that at least one of the radio distance between the first wireless device and the base station and the radio distance between the second wireless device and the base station is less than the predefined threshold radio distance.

13. The network node of claim 9 wherein the processing sub-system is further configured to:
determine that neither of the radio distance between the first wireless device and the base station and the radio distance between the second wireless device and the base station is less than the predefined threshold radio distance based on the information that is indicative of the radio distance between the first wireless device and the base station and the information that is indicative of the radio distance between the second wireless device and the base station; and select an uplink resource of the base station as the resource for the direct device to device communication link between the first wireless device and the second wireless device in response to determining that neither of the radio distance between the first wireless device and the base station and the radio distance between the second wireless device and the base station is less than the predefined threshold radio distance.

14. The network node of claim 8 wherein the base station that is closest to the second wireless device in the cellular communication network is a neighboring base station of the base station that is closest to the first wireless device in the cellular communication network, and the processing sub-system is further configured to:
receive, from the first wireless device via the transceiver sub-system, information that is indicative of the radio distance between the first wireless device and the base station that is closest to the first wireless device in the cellular communication network; and
receive, from the neighboring base station via the transceiver sub-system, information that is indicative of the radio distance between the second wireless device and the neighboring base station in the cellular communication network that is closest to the second wireless device.

15. The network node of claim 14 wherein the information that is indicative of the radio distance between the first wireless device and the base station comprises at least one of a group consisting of: an RSRP value, an RSRQ value, a CQI value, an RSSI value, and a CSI value.

16. The network node of claim 14 wherein the processing sub-system is further configured to:
determine whether at least one of the radio distance between the first wireless device and the base station and the radio distance between the second wireless device and the neighboring base station is less than the predefined threshold radio distance based on the information that is indicative of the radio distance between the first wireless device and the base station and the information that is indicative of the radio distance between the second wireless device and the neighboring base station;
select a downlink resource of the base station and the neighboring base station as the resource for the direct device to device communication link between the first wireless device and the second wireless device if at least one of the radio distance between the first wireless device and the base station and the radio distance between the second wireless device and the neighboring base station is less than the predefined threshold radio distance; and
select an uplink resource of the base station and the neighboring base station as the resource for the direct device to device communication link between the first wireless device and the second wireless device if neither of the radio distance between the first wireless device and the base station and the radio distance between the second wireless device and the neighboring base station is less than the predefined threshold radio distance.

17. The network node of claim 14 wherein the processing sub-system is further configured to:
determine that at least one of the radio distance between the first wireless device and the base station and the radio distance between the second wireless device and the neighboring base station is less than the predefined threshold radio distance based on the information that is indicative of the radio distance between the first wireless device and the base station and the information that is indicative of the radio distance between the second wireless device and the neighboring base station; and
select a downlink resource of the base station and the neighboring base station as the resource for the direct device to device communication link between the first wireless device and the second wireless device in response to determining that at least one of the radio distance between the first wireless device and the base station and the radio distance between the second wireless device and the neighboring base station is less than the predefined threshold radio distance.

18. The network node of claim 14 wherein the processing sub-system is further configured to:
determine that neither of the radio distance between the first wireless device and the base station and the radio distance between the second wireless device and the neighboring base station is less than the predefined threshold radio distance based on the information that is indicative of the radio distance between the first wireless device and the base station and the information that is indicative of the radio distance between the second wireless device and the neighboring base station; and
select an uplink resource of the base station and the neighboring base station as the resource for the direct device to device communication link between the first wireless device and the second wireless device in response to determining that neither of the radio distance between the first wireless device and the base station and the radio distance between the second wireless device and the neighboring base station is less than the predefined threshold radio distance.

19. The network node of claim 1 wherein the network node is the first wireless device.

20. The network node of claim 19 wherein the base station that is closest to the first wireless device in the cellular communication network and the base station that is closest to the second wireless device in the cellular communication network are the same base station, and the processing sub-system is further configured to:
determine, by the first wireless device, information that is indicative of the radio distance between the first wireless device and the base station; and
receive, from the base station via the transceiver sub-system, information that is indicative of the radio distance between the second wireless device and the base station.

21. The network node of claim 20 wherein the information that is indicative of the radio distance between the first wireless device and the base station comprises at least one of a group consisting of: an RSRP value, an RSRQ value, a CQI value, an RSSI value, and a CSI value.

22. The network node of claim 20 wherein the processing sub-system is further configured to:
determine whether at least one of the radio distance between the first wireless device and the base station and the radio distance between the second wireless device and the base station is less than the predefined threshold radio distance based on the information that is indicative of the radio distance between the first wireless device and the base station and the information that is indicative of the radio distance between the second wireless device and the base station;
select a downlink resource of the base station as the resource for the direct device to device communication link between the first wireless device and the second wireless device if at least one of the radio distance between the first wireless device and the base station and the radio distance between the second wireless device and the base station is less than the predefined threshold radio distance; and select an uplink resource of the base station as the resource for the direct device to device communication link between the first wireless device and the second wireless device if neither of the radio distance between the first wireless device and the base station and the radio distance between the second wireless device and the base station is less than the predefined threshold radio distance.

23. The network node of claim 20 wherein the processing sub-system is further configured to:

determine that at least one of the radio distance between the first wireless device and the base station and the radio distance between the second wireless device and the base station is less than the predefined threshold radio distance based on the information that is indicative of the radio distance between the first wireless device and the base station and the information that is indicative of the radio distance between the second wireless device and the base station; and select a downlink resource of the base station as the resource for the direct device to device communication link between the first wireless device and the second wireless device in response to determining that at least one of the radio distance between the first wireless device and the base station and the radio distance between the second wireless device and the base station is less than the predefined threshold radio distance.

24. The network node of claim 20 wherein the processing sub-system is further configured to:

determine that neither of the radio distance between the first wireless device and the base station and the radio distance between the second wireless device and the base station is less than the predefined threshold radio distance based on the information that is indicative of the radio distance between the first wireless device and the base station and the information that is indicative of the radio distance between the second wireless device and the base station; and select an uplink resource of the base station as the resource for the direct device to device communication link between the first wireless device and the second wireless device in response to determining that neither of the radio distance between the first wireless device and the base station and the radio distance between the second wireless device and the base station is less than the predefined threshold radio distance.

25. The network node of claim 19 wherein the base station that is closest to the second wireless device in the cellular communication network is a neighboring base station of the base station that is closest to the first wireless device in the cellular communication network, and the processing sub-system is further configured to:

determine, by the first wireless device, information that is indicative of the radio distance between the first wireless device and the base station; and receive, from the base station via the transceiver sub-system, information that is indicative of the radio distance between the second wireless device and the neighboring base station.

26. The network node of claim 25 wherein the information that is indicative of the radio distance between the first wireless device and the base station comprises at least one of a group consisting of: an RSRP value, an RSRQ value, a CQI value, an RSSI value, and a CSI value.

27. The network node of claim 25 wherein the processing sub-system is further configured to:

determine whether at least one of the radio distance between the first wireless device and the base station and the radio distance between the second wireless device and the neighboring base station is less than the predefined threshold radio distance based on the information that is indicative of the radio distance between the first wireless device and the base station and the information that is indicative of the radio distance between the second wireless device and the neighboring base station;

select a downlink resource of the base station and the neighboring base station as the resource for the direct device to device communication link between the first wireless device and the second wireless device if at least one of the radio distance between the first wireless device and the base station and the radio distance between the second wireless device and the neighboring base station is less than the predefined threshold radio distance; and select an uplink resource of the base station and the neighboring base station as the resource for the direct device to device communication link between the first wireless device and the second wireless device if neither of the radio distance between the first wireless device and the base station and the radio distance between the second wireless device and the neighboring base station is less than the predefined threshold radio distance.

28. The network node of claim 27 wherein the processing sub-system is further configured to:

determine that at least one of the radio distance between the first wireless device and the base station and the radio distance between the second wireless device and the neighboring base station is less than the predefined threshold radio distance based on the information that is indicative of the radio distance between the first wireless device and the base station and the information that is indicative of the radio distance between the second wireless device and the neighboring base station; and select the downlink resource of the base station and the neighboring base station as the resource for the direct device to device communication link between the first wireless device and the second wireless device in response to determining that at least one of the radio distance between the first wireless device and the base station and the radio distance between the second wireless device and the neighboring base station is less than the predefined threshold radio distance.

29. The network node of claim 27 wherein the processing sub-system is further configured to:

determine that neither of the radio distance between the first wireless device and the base station and the radio distance between the second wireless device and the neighboring base station is less than the predefined threshold radio distance based on the information that is indicative of the radio distance between the first wireless device and the base station and the information that is indicative of the radio distance between the second wireless device and the neighboring base station; and select the uplink resource of the base station and the neighboring base station as the resource for the direct device to device communication link between the first wireless device and the second wireless device in response to determining that neither of the radio distance between the first wireless device and the base station and the radio distance between the second wireless device and the neighboring base station is less than the predefined threshold radio distance.

30. A method of operation of a network node configured to select resources for a direct device to device communication link between a first wireless device and a second wireless device in a cellular communication network, comprising:

selecting a downlink resource of the cellular communication network as a resource for the direct device to device communication link between the first wireless device and the second wireless device if at least one of a radio distance between the first wireless device and a base station in the cellular communication network that is closest to the first wireless device and a radio distance between the second wireless device and a base station in the cellular communication network that is closest to the second wireless device is less than a predefined threshold radio distance; and selecting an uplink resource of the cellular communication network as the resource for the direct device to device communication link between the first wireless device and the second wireless device if the radio distance between the first wireless device and the base station in the cellular communication network that is closest to the first wireless device and the radio distance between the second wireless device and the base station in the cellular communication network that is closest to the second wireless device are greater than the predefined threshold radio distance.

* * * * *